United States Patent
Johnson

(10) Patent No.: US 10,649,770 B2
(45) Date of Patent: May 12, 2020

(54) κ-SELECTION USING PARALLEL PROCESSING

(71) Applicant: Facebook, Inc., Menlo Park, CA (US)

(72) Inventor: Jeffrey Hoyle Johnson, Brooklyn, NY (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 15/608,593

(22) Filed: May 30, 2017

(65) Prior Publication Data

US 2018/0217836 A1    Aug. 2, 2018

Related U.S. Application Data

(60) Provisional application No. 62/452,855, filed on Jan. 31, 2017.

(51) Int. Cl.
  *G06F 9/28* (2006.01)
  *G06F 7/78* (2006.01)
  *G06F 16/23* (2019.01)
  *G06F 16/435* (2019.01)
  *G06Q 50/00* (2012.01)

(52) U.S. Cl.
  CPC .............. *G06F 9/28* (2013.01); *G06F 7/785* (2013.01); *G06F 16/23* (2019.01); *G06F 16/437* (2019.01); *G06Q 50/01* (2013.01)

(58) Field of Classification Search
  CPC ...... G06F 9/28; G06F 7/785; G06F 17/30002; G06F 17/30035; G06Q 50/01
  See application file for complete search history.

(56) References Cited

U.S. PATENT DOCUMENTS

2013/0191416 A1* 7/2013 Lee ............... G06F 16/24534
  707/771
2013/0247067 A1* 9/2013 Schmit ............... G06F 9/4881
  718/105
2013/0275407 A1  10/2013 Amer-Yahia
  (Continued)

OTHER PUBLICATIONS

Justin Luitjens,"Faster Parallel Reductions on Keple", Feb. 13 2014, NVIDIA Developer Blog (Year: 2014).*
  (Continued)

*Primary Examiner* — Barry Drennan
*Assistant Examiner* — Khoa Vu
(74) *Attorney, Agent, or Firm* — Baker Botts L.L.P.

(57) ABSTRACT

In one embodiment, a method includes accessing a query vector; accessing object vectors; determining input distances corresponding to a distance between the query vector and the object vectors; accessing thread queues; accessing a warp queue; for each of the input distance values: selecting one of the thread queues, when the input distance value is less than a greatest one of the distance values stored in the selected thread queue, inserting the input distance value into the thread queues and ejecting the greatest distance values stored in the thread queue, and when a greatest distance value stored in any of the thread queues is less than a greatest distance value stored in the warp queue, merging the thread queue with the warp queue; identifying the objects represented by an object vector corresponding to the distance values stored in the warp queue; and providing the search results for presentation.

26 Claims, 13 Drawing Sheets

(56) References Cited

U.S. PATENT DOCUMENTS

| | | |
|---|---|---|
| 2015/0095914 A1 | 4/2015 | Mei |
| 2015/0206285 A1* | 7/2015 | Pajak ............... G06T 5/002 382/265 |
| 2016/0055611 A1* | 2/2016 | Manevitch ........... G06T 1/20 345/501 |
| 2016/0188533 A1 | 6/2016 | Kaul |

OTHER PUBLICATIONS

Wieshollek et al. "Primary_Efficient Large-Scale Approximate Nearest Neighbor Search on the GPU" 2016, IEEE (Year: 2016).*
Tang et al. "Efficient Selection Algorithm for Fast k-NN Search on GPUs" 2015, IEEE (Year: 2015).*
Zhang et al. "GPU Accelerate Parallel Odd-Even Merge Sort an OpenCL Method". 2011, IEEE. (Year: 2011).*
EESR received from EPO for EP Patent Application No. 17183684. 4-1222, Mar. 7, 2018.
Wieschollek, et al., Efficient Large-scale Approximate Nearest Neighbor Search on the GPU, 2016 IEEE Conference on Computer Vision and Pattern Recognition, Jun. 27, 2016, pp. 2027-2035.
Qui, et al., GPU-Accelerated Nearest Neighbor Search for 3D Registration, Oct. 13, 2009, Computer Vision Systems, Springer Berlin Heidelberg, Berlin, Heidelberg, pp. 194-203.
Alabi, Tolu et al., "Fast K-selection Algorithms for Graphics Processing Units", Journal of Experimental Algorithmics (JEA), vol. 17, No. 4.2, Jul. 2012.
Tang, Xiaoxin et al., "Efficient Selection Algorithm for Fast κ-NN Search on GPUs", Parallel and Distributed Processing Symposium (IPDPS), IEEE International, Jul. 20, 2015.
International Search Report and Written Opinion for International Application PCT/US2017/035154, dated Oct. 26, 2017.
Alabi, et al., Fast k-selection algorithms for graphics processing units, ACM Journal of Experimental Algorithmics, 17:4.2:4.1-4.2:4. 29, Oct. 2012.
Andre, et al., Cache locality is not enough: High-performance nearest neighbor search with product quantization fast scan, In Proc. International Conference on Very Large Data Bases, pp. 288-299, 2015.
Avrithis, et al., Web-scale image clustering revisited, In Proc. International Conference on Computer Vision, pp. 1502-1510, 2015.
Babenko, et al., Efficient indexing of billion-scale datasets of deep descriptors, In Proc. IEEE Conference on Computer Vision and Pattern Recognition, pp. 2055-2063, Jun. 2016.
Babenko, et al., Improving bilayer product quantization for billion-scale approximate nearest neighbors in high dimensions, arXiv preprint arXiv:1404.1831, 2014.
Babenko, et al., The inverted multi-index, In Proc. IEEE Conference on Computer Vision and Pattern Recognition, pp. 3069-3076, Jun. 2012.
Balkesen, et al., Main-Memory Hash Joins on Modern Processor Architectures, IEEE Transactions on Knowledge and Data Engineering, 27(7):1754-1766, 2015.
Barrientos, et al., Knn Query Processing in Metric Spaces Using Gpus, in 17th International European Conference on Parallel and Distributed Computing (Euro-Par 2011), The BIDMach numbers come from the website https://github.com/BIDData/BIDMach/wiki/Benchmarks\#KMeans, vol. 6852 of Lecture Notes in Computer Science, pp. 380-392, Bordeaux, France, Sep. 2011. Springer.
Batcher, et al., Sorting Networks and Their Applications, In Proc. Spring Joint Computer Conference, AFIPS '68 (Spring), pp. 307-314, New York, NY, USA, 1968. ACM.
Boncz, et al., Special issue: Modern hardware, The VLDB Journal, 25(5):623-624, 2016.
Canny, et al., A Multi-Teraflop Constituency Parser Using GPUS, In Proc. Empirical Methods on Natural Language Processing, pp. 1898-1907. ACL, 2013.
Canny, et al., Large-scale learning with zero memory allocation, In BigLearn workshop, NIPS, 2013.
Catanzaro, et al., A Decomposition for In-Place Matrix Transposition, In Proc. ACM Symposium on Principles and Practice of Parallel Programming, PPOPP '14, pp. 193-206, 2014.
Chhugani, et al., Efficient Implementation of Sorting on Multi-Core Simd CPU Architecture, Proc. VLDB Endow., 1(2):131-1324, Aug. 2008.
Cole, et al., Parallel merge Sort, SIAM J. Comput., 17(4):770-785, Aug. 1988.
Collobert, et al., Torch7: A Matlab-Like Environment for Machine Learning, In BigLearn, NIPS Workshop, 2011.
Rupp, Cpu, Gpu and mic hardware characteristics over time, 2013.
Dashti, et al., Efficient Computation of K-Nearest Neighbour Graphs for Large High-Dimensional Data Sets on Gpu Clusters, PLOS ONE, 8(9):1-12, 09 2013.
Dong, et al., Efficient K-Nearest Neighbor Graph Construction for Generic Similarity Measures, In WWW: Proceeding of the International Conference on World Wide Web, pp. 577-586, Mar. 2011.
Douze, et al., Polysemous Codes, In Proc. European Conference on Computer Vision, pp. 785-801. Springer, Oct. 2016.
Ge, et al., Optimized Product Quantization, IEEE Trans. PAMI, 36(4):744-755, 2014.
Garcia-Molina, et al., Main Memory Database Systems: An Overview, IEEE Transactions on Knowledge and Data Engineering, 4(6):509-516, 1992.
Gong, et al., Iterative Quantization: A Procrustean Approach to Learning Binary Codes, In Proc. IEEE Conference on Computer Vision and Pattern Recognition, pp. 817-824, Jun. 2011.
Gong, et al., Multi-scale Orderless Pooling of Deep Convolutional Activation Features, In Proc. European Conference on Computer Vision, pp. 392-407, 2014.
Gordo, et al., Deep Image Retrieval: Learning Global Representations for Image Search, In Proc. European Conference on Computer Vision, pp. 241-257, 2016.
Han, et al., Deep Compression: Compressing Deep Neural Networks with Pruning, Trained Quantization and Huffman Coding, arXiv preprint arXiv:1510.00149, 2015.
He, et al., Deep Residual Learning for Image Recognition, In Proc. IEEE Conference on Computer Vision and Pattern Recognition, pp. 770-778, Jun. 2016.
He, et al., Design and Implementation of a Parallel Priority Queue on Many-Core Architectures, 20th Annual International Conference on High Performance Computing, pp. 1-10, 2012.
He, et al., K-means Hashing: An Affinity-Preserving Quantization Method for Learning Binary Compact Codes, In Proc. IEEE Conference on Computer Vision and Pattern Recognition, pp. 2938-2945, Jun. 2013.
Jégou, et al., Product Quantization for Nearest Neighbor Search, IEEE Trans. PAMI, 33(1):117-128, Jan. 2011.
Jégou, et al., Searching in One Billion Vectors: Re-Rank With Source Coding, In International Conference on Acoustics, Speech, and Signal Processing, pp. 861-864, May 2011.
Johnson, et al., Billion-scale Similarity Search with GPUs, arXiv:1702. 08734v1, [cs.CV] Feb. 28, 2017, pp. 1-12.
Leighton, et al., Introduction to Parallel Algorithms and Architectures: Array, Trees, Hypercubes, Morgan Kaufmann Publishers Inc., San Francisco, CA, USA, 1992.
Kalantidis, et al., Locally Optimized Product Quantization for Approximate Nearest Neighbor Search, In Proc. IEEE Conference on Computer Vision and Pattern Recognition, pp. 2329-2336, Jun. 2014.
Krizhevsky, et al., Imagenet Classification with Deep Convolutional Neural Networks, In Advances in Neural Information Processing Systems, pp. 1097-1105, 2012.
Lai, et al., Performance Upper Bound Analysis and Optimization of Sgemm on Fermi and Kepler Gpus, In Proceedings of the 2013 IEEE/ACM International Symposium on Code Generation and Optimization (CGO), CGO '13, pp. 1-10, Washington, DC, USA, 2013. IEEE Computer Society.
Lindholm, et al., NVIDIA Tesla: A Unified Graphics and Computing Architecture, IEEE Micro, 28(2):39-55, Mar. 2008.
Liu, et al., Ad-heap: An Efficient Heap Data Structure for Asymmetric Multicore Processors, In Proceedings of Workshop on Gen-

(56) References Cited

OTHER PUBLICATIONS eral Purpose Processing Using GPUs, GPGPU-7, pp. 54:54-54:63, New York, NY, USA, 2014. ACM.
Mikolov, et al., Distributed Representations of Words and Phrases and Their Compositionality, In Advances in Neural Information Processing Systems, pp. 3111-3119, 2013.
Monroe, et al., Randomized Selection on the GPU, In Proc. ACM Symposium on High Performance Graphics, pp. 89-98, 2011.
Nickolls, et al., Scalable Parallel Programming with Cuda, Queue, 6(2):40-53, Mar. 2008.
Norouzi, et al., Cartesian K-means, In Proc. IEEE Conference on Computer Vision and Pattern Recognition, pp. 3017-3024, Jun. 2013.
Norouzi, et al., Fast Search in Hamming Space with Multi-Index Hashing, In Proc. IEEE Conference on Computer Vision and Pattern Recognition, pp. 3108-3115, 2012.
Sismanis, et al., Parallel Search of K-Nearest Neighbors with Synchronous Operations, In IEEE High Performance Extreme Computing Conference, pp. 1-6, 2012.
Pan, et al., Fast GPU-based Locality Sensitive Hashing for K-Nearest Neighbor Computation, In Proc. ACM International Conference on Advances in Geographic Information Systems, pp. 211-220, 2011.
Paulevé, et al., Locality Sensitive Hashing: A Comparison of Hash Function Types and Querying Mechanisms, Pattern Recognition Letters, 31(11):1348-1358, Aug. 2010.
Razavian, et al., CNN Features Off-The-Shelf: An Astounding Baseline for Recognition, In CVPR workshops, pp. 512-519, 2014.
Shamir, et al., Fundamental Limits of Online and Distributed Algorithms for Statistical Learning and Estimation, In Advances in Neural Information Processing Systems, pp. 163-171, 2014.
Tang, et al., Efficient Selection Algorithm for Fast K-Nn Search on GPUs, In IEEE International Parallel& Distributed Processing Symposium, pp. 397-406, 2015. Jan. 2016.
Thomee, et al., YFCC100M: The New Data in Multimedia Research, Communications of the ACM, 59(2):64-73, Jan. 2016.
Vasilache, et al., Fast Convolutional Nets with Fbfft: A Gpu Performance Evaluation, Proceedings of the International Conference on Learning Representations (ICLR), 2015.
Volkov, et al., Benchmarking Gpus to Tune Dense Linear Algebra, In Proceedings of the 2008 ACM/IEEE Conference on Supercomputing, SC '08, pp. 31:1-31:11, Piscataway, NJ, USA, 2008. IEEE Press.
Wakataniet, al., GPGPU Implementation of Nearest Neighbor Search with Product Quantization, In IEEE International Symposium on Parallel and Distributed Processing with Applications, pp. 248-253, 2014.
Warashina, et al., Efficient K-Nearest Neighbor Graph Construction Using MaRreduce for Large-Scale Data Sets, IEICE Transactions, 97-D(12):3142-3154, 2014.
Weber, et al., A Quantitative Analysis and Performance Study for Similarity-Search Methods in High-Dimensional Spaces, In Proc. International Conference on Very Large Data Bases, pp. 194-205, 1998.
Wong, et al., Demystifying Gpu Microarchitecture Through Microbenchmarking, In ISPASS, pp. 235-246. IEEE Computer Society, 2010.
Wieschollek, et al., Efficient Large-Scale Approximate Nearest Neighbor Search on the Gpu, In Proc. IEEE Conference on Computer Vision and Pattern Recognition, pp. 2027-2035, Jun. 2016.
Williams, et al., Roofline: An Insightful Visual Performance Model for Multicore Architectures, Commun. ACM, 52(4):65-76, Apr. 2009.

* cited by examiner

300

```
function MERGE-ODD([L_i]_{i=0:ℓ_L}, [R_i]_{i=0:ℓ_R})
    parallel for i ← 0 : min(ℓ_L, ℓ_R) do
            ▷ inverted 1st stage; inputs are already sorted
        COMPARE-SWAP(L_{ℓ_L−i−1}, R_i)
    end for
    parallel do
        ▷ If ℓ_L = ℓ_R and a power-of-2, these are equivalent
        MERGE-ODD-CONTINUE([L_i]_{i=0:ℓ_L}, left)
        MERGE-ODD-CONTINUE([R_i]_{i=0:ℓ_R}, right)
    end do
end function
function MERGE-ODD-CONTINUE([x_i]_{i=0:ℓ}, p)
    if ℓ > 1 then
        h ← 2^{⌈log_2 ℓ⌉−1}              ▷ largest power-of-2 < ℓ
        parallel for i ← 0 : ℓ − h do
                ▷ Implemented with warp shuffle butterfly
            COMPARE-SWAP(x_i, x_{i+h})
        end for
        parallel do
            if p = left then              ▷ left side recursion
                MERGE-ODD-CONTINUE([x_i]_{i=0:ℓ−h}, left)
                MERGE-ODD-CONTINUE([x_i]_{i=ℓ−h:ℓ}, right)
            else                          ▷ right side recursion
                MERGE-ODD-CONTINUE([x_i]_{i=0:h}, left)
                MERGE-ODD-CONTINUE([x_i]_{i=h:ℓ}, right)
            end if
        end do
    end if
end function
```

```
function SORT-ODD([x_i]_{i=0:ℓ})
    if ℓ > 1 then
        parallel do
            SORT-ODD([x_i]_{i=0:⌊ℓ/2⌋})
            SORT-ODD([x_i]_{i=⌊ℓ/2⌋:ℓ})
        end do
        MERGE-ODD([x_i]_{i=0:⌊ℓ/2⌋}, [x_i]_{i=⌊ℓ/2⌋:ℓ})
    end if
end function
```

```
function WARPSELECT(a)
    if a < T₀ʲ then
        insert a into our [Tᵢʲ]ᵢ₌₀:ₜ
    end if
    if WARP-BALLOT(T₀ʲ < W_{k-1}) then
        ▷ Reinterpret thread queues as lane-stride array
        [αᵢ]ᵢ₌₀:₃₂ₜ ← CAST([Tᵢʲ]ᵢ₌₀:ₜ,ⱼ₌₀:₃₂)
                        ▷ concatenate and sort thread queues
        SORT-ODD([αᵢ]ᵢ₌₀:₃₂ₜ)
        MERGE-ODD([Wᵢ]ᵢ₌₀:ₖ, [αᵢ]ᵢ₌₀:₃₂ₜ)
        ▷ Reinterpret lane-stride array as thread queues
        [Tᵢʲ]ᵢ₌₀:ₜ,ⱼ₌₀:₃₂ ← CAST([αᵢ]ᵢ₌₀:₃₂ₜ)
        REVERSE-ARRAY([Tᵢ]ᵢ₌₀:ₜ)
        ▷ Back in thread queue order, invariant restored
    end if
end function
```

*FIG. 5A*

```
function IVFPQ-SEARCH([x_1,...,x_{n_q}], Z_1,...,Z_{C_1})
    for i ← 0 : n_q do                              ▷ batch quantization
        L_{IVF} ← τ-argmin_{c∈C_1} ||x − c||_2
    end for
    for i ← 0 : n_q do
        L ← []
        Compute ⟨x, q_2(...)⟩                       ▷ distance table
        for L in L_{IVF} do                         ▷ τ loops
            Compute distance tables T_1,...,T_b
            for j in Z_L do
                                                    ▷ distance estimation, ||x − q(y)||²_2 = ||x̃¹ − q¹(ỹ¹)||²_2 + ... + ||x̃^b − q^b(ỹ^b)||²_2
                d ← ||x_i − q(y_j)||²_2
                Append (d, L, j) to L
            end for
        end for
        R_i ← k-select smallest distances d from L
    end for
    return R
end function
```

FIG. 6

κ-SELECTION USING PARALLEL PROCESSING

PRIORITY

This application claims the benefit, under 35 U.S.C. § 119(e), of U.S. Provisional Patent Application No. 62/452,855 filed 31 Jan. 2017, which is incorporated herein by reference.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a similarity search (e.g., identifying object vectors in a collection that are similar to a query vector) may be performed using parallel processing. A similarity between two vectors may be defined based on a distance metric (e.g., an $L^2$ distance, a cosine similarity, etc.) between the two vectors. In particular embodiments, a similarity search may be a k-nearest neighbor (k-NN) search, which may identify the k most similar objects or object vectors to a query or query vector. In particular embodiments, a k-NN search may be an exact nearest neighbor search. In particular embodiments, a k-NN search may be an approximate nearest neighbor (ANN) search. In particular embodiments, a similarity search may comprise accessing input comprising the distances values and performing k-selection. The distances values may be exact distance values or approximated distance values (e.g., distances between quantized vectors generated by a quantizer or product quantizer). In particular embodiments, k-selection may comprise identifying the k least distances values or the objects corresponding to the k least distance values. In particular embodiments, k-selection may comprise identifying the k greatest distances values or the objects corresponding to the k greatest distance values. In particular embodiments, k-selection may be performed using parallel processing on a graphics processing unit (GPU) or any other suitable. In particular embodiments, a method for k-selection may use in-register sorting. Each thread of a GPU may maintain a local queue of smallest values called a thread queue, which may be stored in register memory. A warp of a GPU may maintain a queue of distance values called a warp queue. In particular embodiments, a warp of a GPU may refer to a wavefront of a GPU and a warp queue may be a wavefront queue. In particular embodiments, a warp queue may be stored as a lane-stride register array. Input distance values may be scanned and as a distance value is scanned, it may be attempted to be inserted into a thread queue. If the scanned distance value is greater than all the current values in the thread queue, the scanned distance value may be discarded; otherwise, the scanned distance value may be placed into the thread queue and the greatest distance value in the thread queue may be discarded. Each thread queue may be sorted by size (e.g., scanned distance values may be inserted using a sorting algorithm). The thread queues may be merged into the warp queue (e.g., using a parallel sort), which may maintain the least distance values identified across the threads. In particular embodiments, the warp queue may be stored in shared memory of a GPU. In particular embodiments, the warp queue may be stored in register memory of a GPU. Once the input distances values are scanned, the warp queue may store the distances values corresponding to the k nearest neighboring object vectors with respect to the query vector.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates an example odd-size merging network algorithm.

FIG. 4 illustrates an example algorithm extending a merge to a full sort.

FIG. 5A illustrates an example algorithm for k-selection.

FIG. 6 illustrates an example algorithm for inverted file with product quantization indexing with the three loop levels.

DESCRIPTION OF EXAMPLE EMBODIMENTS

Figure 1:
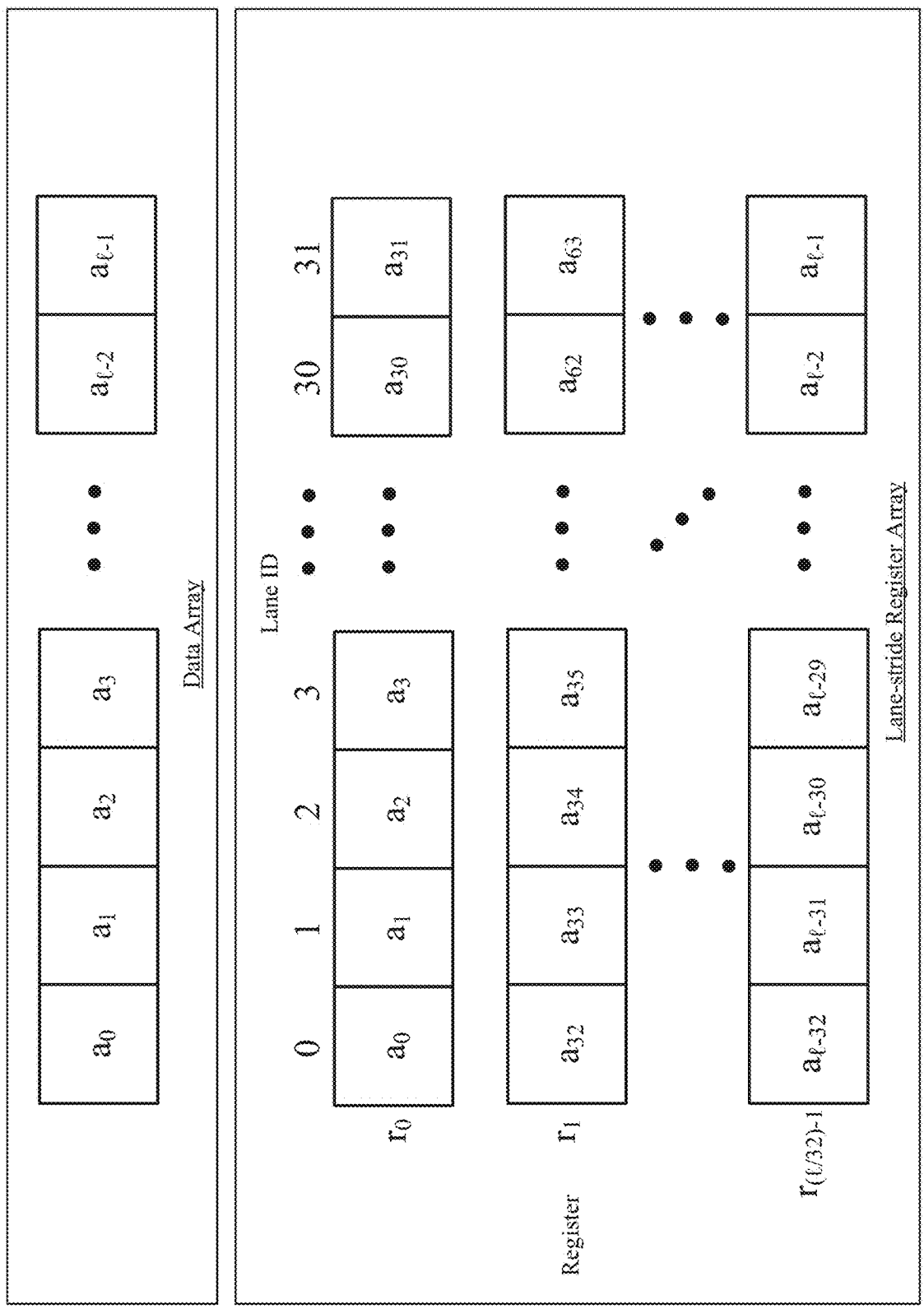
FIG. 1 illustrates an example data array and an example lane-stride register array.

In particular embodiments, a similarity search (e.g., identifying object vectors in a collection that are similar to a query vector) may be performed using parallel processing. A similarity between two vectors may be defined based on a distance metric (e.g., an $L^2$ distance, a cosine similarity, etc.) between the two vectors. In particular embodiments, a similarity search may be a k-nearest neighbor (k-NN) search, which may identify the k most similar objects or object vectors to a query or query vector. In particular embodiments, a k-NN search may be an exact nearest neighbor search. In particular embodiments, a k-NN search may be an approximate nearest neighbor (ANN) search. In particular embodiments, a similarity search may comprise accessing input comprising the distances values and performing k-selection. The distances values may be exact distance values or approximated distance values (e.g., distances between quantized vectors generated by a quantizer or product quantizer). In particular embodiments, k-selection may comprise identifying the k least distances values or the objects corresponding to the k least distance values. In particular embodiments, k-selection may comprise identifying the k greatest distances values or the objects corresponding to the k greatest distance values. In particular embodiments, k-selection may be performed using parallel processing on a graphics processing unit (GPU) or any other suitable. In particular embodiments, a method for k-selection may use in-register sorting. Each thread of a GPU may maintain a local queue of smallest values called a thread queue, which may be stored in register memory. A warp of a GPU may maintain a queue of distance values called a warp queue. In particular embodiments, a warp of a GPU may refer to a wavefront of a GPU and a warp queue may be a wavefront queue. In particular embodiments, a warp queue may be stored as a lane-stride register array. Input distance values may be scanned and as a distance value is scanned, it may be attempted to be inserted into a thread queue. If the scanned distance value is greater than all the current values in the thread queue, the scanned distance value may be discarded; otherwise, the scanned distance value may be placed into the thread queue and the greatest distance value in the thread queue may be discarded. Each thread queue may be sorted by size (e.g., scanned distance values may be inserted using a sorting algorithm). The thread queues may be merged into the warp queue (e.g., using a parallel sort), which may maintain the least distance values identified across the threads. In particular embodiments, the warp queue may be stored in shared memory of a GPU. In particular embodiments, the warp queue may be stored in register memory of a GPU. Once the input distances values are scanned, the warp queue may store the distances values corresponding to the k nearest neighboring object vectors with respect to the query vector.

In particular embodiments, a similarity search for a small number of results (e.g., k<1000) may be performed. In particular embodiments, a selection state may be maintained in shared or register memory. In particular embodiments, selection via max-heap may be performed on a central processing unit (CPU). As an example and not by way of limitation, selection via max-heap may use implementations available for modern multicore Single instruction, multiple data (SIMD) CPUs, such as Liu and Vinter's ad-heap. In particular embodiments, heaps may not expose much data parallelism (e.g., due to serial tree update) and may not saturate SIMD execution units, which the ad-heap may address. In particular embodiments, a CPU may attempt to partition serial and parallel operations between appropriate execution units. In particular embodiments, for small k, the CPU may maintain all of its state in the L1 cache with little effort. In particular embodiments, the L1 cache latency and bandwidth may be a limiting factor.

In particular embodiments, heaps may be implemented on a graphics processing unit (GPU). In particular embodiments, a straightforward GPU heap implementation will suffer from high warp divergence and irregular, data-dependent memory movement if each thread maintains its own heap, since heap update is inherently a serial process, and the path taken for each inserted element depends upon its value and other values present in the heap. Shared memory may be designed for irregular data movement, but may be slower than register file memory and the heap update itself may be a serial process.

In particular embodiments, parallel priority queues may providing for multiple inserts or deletions at the same time. In particular embodiments, the parallel priority queue may requires a potential number of small parallel sorts for each insert, as well as data-dependent memory movement, so the data structure may only efficiently be maintained in global or shared memory. Parallel priority queues may use multiple synchronization barriers through kernel launches in different streams, as well as the additional latency of successive kernel launches and coordination with the CPU host program.

In particular embodiments, parallel merges of a hierarchy of sorted queues in shared memory may be used to sort for small k. In particular embodiments, parallel merges of a hierarchy of sorted queues may suffer from too many synchronization points, greater kernel launch overhead and excessive buffering (offering more opportunity for intra-warp divergence or block-wide synchronization).

In particular embodiments, data may be stored in faster memory. In particular embodiments, entities may be represented by real-value vectors produced by complex learning machinery. As an example and not by way of limitation, word2vec, embeddings of images by convolutional neural networks, and vector representations of relationships via embeddings may be used. In particular embodiments, a search may be performed by searching by similarity rather than in structured relational databases.

In particular embodiments, a database system may manage a set of structured tables. The records stored in the tables may contain scalar or textual fields and may be hashed or sorted to perform efficient non-exhaustive searches. The data from which the tables are populated may be input manually.

In particular embodiments, a source of information may be images and videos, with some meta-data. In particular embodiments, users may not provide extensive metadata to their pictures. In particular embodiments, automatic media analysis algorithms may produce vector data for information. As an example and not by way of limitation, vector data may be the outputs of a set of classifiers for random objects, applied to an image, text embeddings like word2vec, image descriptors for instance search, etc. In particular embodiments, a database management system may be able to search by similarity. As an example and not by way of limitation, a similarity search may find the most similar content to a picture, or to apply a classifier on all vectors of a collection.

In particular embodiments, a similarity search in vector collections may be performed. As an example and not by way of limitation, given the query vector $x \in \mathbb{R}^d$ and the collection $[y_i]_{i=1 \ldots N} = Y \in \mathbb{R}^{d \times N}$ the following may be searched $$L = k\text{-argmin}_{i=1 \ldots N} \|x - y_i\|_2$$

This may be a search for the k nearest neighbors of x in terms of L2 distance. Although this disclosure may describe a particular distance metric, this disclosure contemplates the use of any suitable distance metric.

In particular embodiments, a search may be performed in batches of $n_q$ query vectors $[x_j]_{j=1 \ldots n_q} = X \in \mathbb{R}^{d \times n_q}$ in parallel, which may allow for more flexibility when executed on multiple CPU threads or on GPU.

In particular embodiments, the exact solution may consist in computing the full pairwise distance matrix $D = [\|x_j - y_i\|_2^2]_{i=1 \ldots N, j=1 \ldots n_q} \in \mathbb{R}^{N \times n_q}$. In particular embodiments, the following decomposition may be used:

$$\|x_j - y_i\|_2^2 = \|x_j\|^2 + \|y_i\|^2 - 2x_j^T y_i$$

The two first terms may be precomputed in one pass over the matrices X and Y. In particular embodiments, the bottleneck for the computation of the distance matrix D may be evaluating the last term, equivalent to the matrix multiplication $X^T Y$. As an example and not by way of limitation, a classical dataset used to evaluate nearest neighbor search SIFT1M may have characteristic sizes of $N=10^6$, $d=128$, $n_q=10^4$. Computing the full distance matrix using the matrix multiplication may cost $N \times n_q \times d = 1.28$ Tflop, which may run in less than one second on current GPUs that have optimal hardware and software support for this operation.

In particular embodiments, the inverted file with asymmetric distance computation (IVFADC) indexing structure may be used for approximate nearest-neighbor search in large datasets. The IVFADC may use two levels of quantization, and the database vectors may be encoded. The database vector y may be approximated as:

$$y \approx q(y) = q_1(y) + q_2 - q_1(y))$$

where $q_1: \mathbb{R}^d \to C_1 \subset \mathbb{R}^d$ and $q_2: \mathbb{R}^d \to C_2 \subset \mathbb{R}^d$ may be quantization functions, (e.g., functions that output an element from a finite set). In particular embodiments, q(y) may be encoded as the index of $q_1(y)$ and that of $q_2(y-q_1(y))$. In particular embodiments, the first-level quantizer may be a "coarse quantizer" and the second level quantizer may encode the residual vector after this first level.

In particular embodiments, the asymmetric distance computation (ADC) search method may return an approximate result:

$$L_{ADC} = k\text{-argmin}_{i=1 \ldots N} \|x - q(y_i)\|_2$$

For IVFADC the search may not be exhaustive. Vectors for which the distance is computed are pre-selected may depend on the first-level quantizer $q_1$:

$$L_{IVF} = \tau\text{-argmin}_{c \in C_1} \|x - c\|_2$$

The "multi-probe" parameter τ may be the number of reproduction values considered. This quantization operation may be a nearest-neighbor search with exact distances, in the set of reproduction values, see the equation $L = k\text{-argmin}_{i=1 \ldots N} \|x - y_i\|_2$.

The IVFADC search may compute $$L_{IVFADC} = \begin{array}{c} k - \text{argmin} \\ i = 1 \ldots N \text{ such that } q_1(y_i) \in L_{IVF} \end{array} \|x - q(y_i)\|_2$$

IVFADC may rely on the same distance estimations as the two-step quantization of ADC, but may compute them only on a subset of vectors.

The corresponding data structure, the inverted file, may group the vectors $y_i$ into $|C_1|$ inverted lists $\mathcal{I}_1, \ldots, \mathcal{I}_{|C_1|}$ with homogeneous $q_1(y_i)$. In particular embodiments, the most memory-intensive operation may be computing $L_{IVFADC}$, which may boil down to linearly scanning τ inverted lists.

In particular embodiments, the two quantizers $q_1$ and $q_2$ may have different properties. The coarse quantizer $q_1$ may have a relatively low number of reproduction values so that the size of the table of inverted lists does not explode. In particular embodiments, $|C_1| \approx \sqrt{N}$ may be used, trained via k-means. In particular embodiments the fine quantizer may be afforded more bytes to spend on a more extensive representation. The id of the vector (a 4- or 8-byte integer) may also be stored in the inverted lists, so there may not be shorter codes than that (e.g., $\log_2|C_2| > 4 \times 8$). In particular embodiments, a product quantizer for $q_2$ may be used, which may provide a large number of reproduction values without increasing the processing cost.

In particular embodiments, the product quantizer may breaks down the vector to quantize y into segments of sub-vectors $y = [y^1 \ldots y^b]$. In particular embodiments, d may be a multiple of the number of sub-vectors b. Each sub-vector may then quantized separately with its own quantizer, which may yield the tuple $(q^1(y^1), \ldots, q^b(y^b))$. The sub-quantizers may have 256 reproduction values, so that the sub-codes may be stored in one byte. The quantization value of the product quantizer may be $q_2(y) = q^1(y^1) + 256 \times q^2(y^2) + \ldots + 256^{b-1} \times q^b$, which from a storage point of view may be the concatenation of the bytes produced by each sub-quantizer.

In particular embodiments, the product quantizer may generate b-byte codes that have $|C_2| = 256^b$ reproduction values. In particular embodiments, the k-means dictionaries of the quantizers may be small and the quantization may be computationally cheap.

In particular embodiments, a GPU may be used. In particular embodiments, a system that uses NVIDIA's general-purpose GPU features may be used. As an example and not by way of limitation, a system that uses presentations of NVIDIA GPU architecture or NVIDIA's CUDA programming model may be used. Although this disclosure describes use of GPUs, GPUs featuring NVIDIA GPU architecture, and NVIDIA's CUDA programming model, this disclosure contemplates use of suitable system, and suitable architecture, and any suitable programming model. As an example and not by way of limitation, this disclosure contemplates use of ADVANCED MICRO DEVICES (AMD) systems, architectures, or programming models. Further, particular embodiments may use the term warp as interchangeable with wavefront, or any suitable group of threads that processes a single instruction over all threads in the group at the same time.

In particular embodiments, the NVIDIA GPU may be a general-purpose computer that may execute instruction streams using a 32-wide vector of CUDA threads (the warp). Individual threads in the warp may be referred to as lanes, with a lane ID from 0-31. In particular embodiments, an analogy to modern vectorized multicore CPUs may be used to view each warp is a separate CPU hardware thread, as the warp shares an instruction counter. The architecture may allow for divergence of execution among the individual lanes, but if separate lanes in a warp wish to execute different instruction paths, then execution may be serialized, which may degrade performance.

In particular embodiments, each lane in a warp may access to up to 255 32-bit registers in a shared register file. In particular embodiments the CPU analogy may be that the CPU thread has up to 255 vector registers of width 32. The warp lanes may correspond to SIMD vector lanes. On a CPU, special handling or masking of vector registers may be used when not all lanes in the vector register are used for valid data. The CUDA programming model may handling masking at the instruction execution level, which may allow divergent codepaths in different warp lanes at the expense of reduced efficiency.

In particular embodiments, a user-configurable collection of 1-32 warps (thus, 32-1024 CUDA threads) may comprise a block or a co-operative thread array (CTA). Each block may access a high speed shared memory, up to 48 KB in size. Individual CUDA threads may have a block-relative ID, called a thread id. This may be used to partition and assign work. Each block may be run on a single core of the GPU called a streaming multiprocessor (SM); once instantiated on a SM, it may run until completion without migrating to another SM.

In particular embodiments, each SM may have functional units, including many independent floating point and integer arithmetic-logic units (ALUs), memory load/store units, and various special instruction units. The scheduler of a SM may manage a collection of warps, waiting for previously issued operations to complete (or functional units to become available) and scheduling new warp-wide instructions on them. A GPU may hide execution latencies by having many independent operations in flight on independent warps. For each individual warp lane, the instruction throughput may be low and instruction latency may be high, but the aggregate throughput of all warps may be higher than typical CPUs.

In particular embodiments, blocks may be organized in a grid of blocks in a kernel. Each block within a grid may be assigned a grid relative ID. The kernel may be the unit of work that the CPU schedules to work on the GPU. All blocks (and warps within those blocks) may be given the same instruction stream for a given kernel launch to execute, though the paths through that instruction stream may vary for each warp or block within the kernel with no penalty. After an instantiated block runs through to completion, new blocks may be scheduled. Blocks from different kernels may run concurrently. In particular embodiments, there may be no guaranteed execution ordering between blocks in a single kernel's grid, but ordering between kernels may be controllable by using CUDA ordering primitives. If kernel $k_b$ is desired to execute after kernel $k_a$, then all grid blocks in $k_a$ may complete execution before $k_b$ is run.

In particular embodiments, the number of blocks that can execute at the same time may depend upon the resources that each block requires. The number of registers in use by each thread may be determined at compilation time, and may determine how much of the register file of each SM is used per block. Shared memory and register file usage may affect occupancy on the GPU. If a block demands all 48 KB of shared memory for its private usage, or 128 registers per thread as opposed to 32, then it may be the case that only 1-2 other blocks may run concurrently on the same SM, which may result in low occupancy. Under high occupancy more warps may be present per SM, which may allow more work to be in flight at once.

In particular embodiments, the term saturation may refer to the degree to which a kernel meets the maximum occupancy it can attain on the GPU. If a kernel exposes insufficient parallelism, (e.g., has few of blocks in its grid an overall has a small number of warps), it may only be running on a fraction of SMs available in the system, and may have lower performance than the potential peak.

In particular embodiments, separate blocks may not be able to access each others' shared memory, and may only communicate through the GPU's main on-board memory, called global memory. The GPU may have a smaller main memory than the CPU (12-32 GB), but the memory may have a higher bandwidth. In particular embodiments, reads may be done at contiguous addresses by neighboring lanes in the warp. Memory accesses from a warp may be coalesced into contiguous 128 byte segments. As an example and not by way of limitation, if every other 4 byte word from a warp is read, memory requests for contiguous 128 byte requests may still be issued, of which only use half may be used.

In particular embodiments, shared memory may be analogous to CPU L1 cache in terms of speed. GPU register file memory may be the highest bandwidth memory. As an example and not by way of limitation, in order to maintain the high number of instructions in flight on a GPU, a vast register file may be used to provide them with arguments: 14 MB in the latest Pascal P100 (in contrast with a few tens of KB on CPU). A ratio of 250:6.25:1 may be used for GPU aggregate register file to shared memory to global memory bandwidth. In particular embodiments, using more shared memory per warp may increase its efficiency, but may decrease the number of warps that can be scheduled in parallel.

In particular embodiments, greater per-thread register usage (and thus lower occupancy) may allow for increased instruction level parallelism (ILP), as multiple independent requests for memory loads may be issued before the results are needed. In particular embodiments, the warp scheduler within a SM may be relied on to switch to other warps while a warp is waiting for the loads it issued. In particular embodiments, some degree of ILP may be used to utilize all functional units (ALUs, load/store slots, etc.).

In particular embodiments, a single lane may manage values arbitrarily between its (scalar) registers to solve a lane-local task, but may have limited parallelism. As on the CPU, where there are a variety of vector shuffle instructions to exchange values between SIMD lanes, lanes in a GPU warp may exchange register data using the warp shuffle instruction. The warp shuffle may allow each lane in the warp to access a register value from any other lane, in an arbitrary mapping. This may enable the entire warp to participate in accessing a segment of shared register memory, and may have greater parallelism operating on the register memory. This may allow data to be stored in the highest speed memory if access patterns are suitable.

FIG. 1 illustrates an example data array and an example lane-stride register array. In particular embodiments, a lane-stride register array may be used to represent a data array within a warp in register memory. For an array of length l, $[a_i]_{i=0 \ldots l-1}$, each successive value in the array may be held in a single register by neighboring lanes. In order to fit into the warp size 32 evenly with no need for boundary handling, l may be a multiple of 32. The array may be stored in $$\frac{l}{32}$$

registers per lane. In particular embodiments, l may be known at compile time so that register memory can be reserved. Lane 0 may be responsible for storing $\{a_0, a_{32}, a_{64}, \ldots, a_{l-32}\}$, lane 1 may store $\{a_1, a_{33}, a_{65}, \ldots, a_{l-31}\}$, and so forth. In particular embodiments, $\{a_0, a_1, \ldots, a_{31}\}$ may be held in register $r_0$, $\{a_{32} \ldots, a_{63}\}$ in register $r_1$, on up to the last register $$r_{(\frac{l}{32})-1}.$$

In particular embodiments, the register in which $a_i$ is stored (e.g., [i/32]) may be known at compile time for manipulating specific entries in the array $a_i$. What lane is accessed (i.e., i mod 32) may be runtime knowledge, since warp shuffles offer dynamic indexing. The warp shuffle may allow for parallel access by the warp; for a given register, all lanes access a value held by another lane and perform an operation. A wide variety of lane access patterns (shift, rotate, any-to-any) may be provided by warp shuffles. In particular embodiments, the butterfly permutation may be used.

In particular embodiments, given an array $[x_i]_{i=0 \ldots l-1}$ of length l, k-selection may find the k lowest valued elements $[x_{s_i}]_{i=0 \ldots k-1}$, $x_{s_i} \leq x_{s_{i+1}}$, along with the indices $[s_i]_{i=0 \ldots k-1}$, $S_i \in \{0, \ldots, n-1\}$ of those elements from the original array. The $x_i$ notation may refer to elements of arrays, the $[x_i]$ notation as an array, with the index bounds listed on first definition. A 0-based indexing may be used to better map to memory indexing. In particular embodiments, the order between equivalent keys $x_{s_i} = x_s$ may not be specified; a stable partial sort may not needed. The $x_i$ may be 32-bit floating point values; the $s_i$ may be 32- or 64-bit integers.

In particular embodiments, batches of independent arrays may be available. As an example and not by way of limitation, when nearest-neighbor queries are performed by batches. In particular embodiments, each of the per-object k-selection problems may be independent but the per-array throughput of the overall k-selection problem may be improved with batching. Batching may increase the GPU utilization and hide latencies, and some computations for sub-problems may be shared before or after any k-selection steps. In particular embodiments, n×k elements may be selected from n separate arrays $[a_i]_{i=0 \ldots n-1}$, where each array $a_l$ may be of a potentially different length $l_i \geq k$, $a_i = [x_j]_{j=0 \ldots l_i-1}$.

In particular embodiments, the elements of the arrays may not be stored, but computed on-the-fly. In particular embodiments, the full, explicit array may be too large to fit into any memory, and its size may be unknown at the start of the processing. In particular embodiments, other comparators that define a total order may be acceptable. As an example and not by way of limitation, when using the cosine similarity, the maximum similarity may be search for instead of the minimum.

In particular embodiments, for any CPU or GPU algorithm, either memory or arithmetic throughput may be the limiting factor as per the roofline performance model. If k-selection input comes from global memory, an algorithm may not run faster than the time required to scan the input once. The peak performance for a k-selection problem may be given by this limit. As an example and not by way of limitation, 1 GB of memory may not be able to be k-selected faster than 2.72 ms on a TITAN X, for any value of k.

In particular embodiments, intermediate state may be kept in faster memories for small k. As an example and not by way of limitation, the TITAN X may have a maximum of 48 KiB bytes of shared and 256 KiB of register memory available per block. For 32-bit key and index values, this an absolute maximum may be determined as k of 6,144 (shared memory) and 32,768 (register memory). In particular embodiments, shared memory may allow for dynamic indexing and suffers fewer penalties for irregular data access patterns. It may also allow for the exchanging of data intra-warp and cross-warp within a block. But, shared memory may be smaller than register file memory and may be slower compared to the register file. In particular embodiments, register memory may be attributed to individual threads. In particular embodiments, in order to use register memory, the indexing into the register file (registers read or written) must be known at assembly time.

In particular embodiments, an in-register sorting primitive may be used as a building block. In particular embodiments, sorting networks may be used on SIMD architectures and may exploit vector parallelism. In particular embodiments, sorting networks may be implemented on the GPU, and using lane-stride register arrays, large networks may be maintained exclusively in register memory.

In particular embodiments, a variant of Batcher's bitonic sorting network may be used, which may be a collection of parallel merges on an array of size $2^k$. The merges may take n arrays of length l (n and l may be a power of 2) to n/2 arrays of length 2l. Each merge may have lg(l) parallel steps. In particular embodiments, a bitonic sort may apply this merge recursively: first merge n arrays of length 1 to n/2 arrays of length 2, to n/4 arrays of length 4, successively to 1 sorted array of length n. In particular embodiments, a sort may have $$\frac{1}{2}(lg(l)^2 + lg(l))$$

parallel merge steps in total.

In particular embodiments, the network may be modified to avoid some merging steps if some of the input data is already sorted. In particular embodiments, there may not be a full power-of-2 set of data, in which case a shortcut may be used to deal with the smaller size.

FIG. 3 illustrates an example odd-size merging network algorithm 300. Algorithm 300 may be an odd-sized merging network that merges already sorted left and right arrays, each of arbitrary length. While the bitonic network merges bitonic sequences, monotonic sequences may be started with (e.g., sequences sorted in the same order). A bitonic merge may be converted into a monotonic merge by reversing the first comparator stage.

Figure 2:
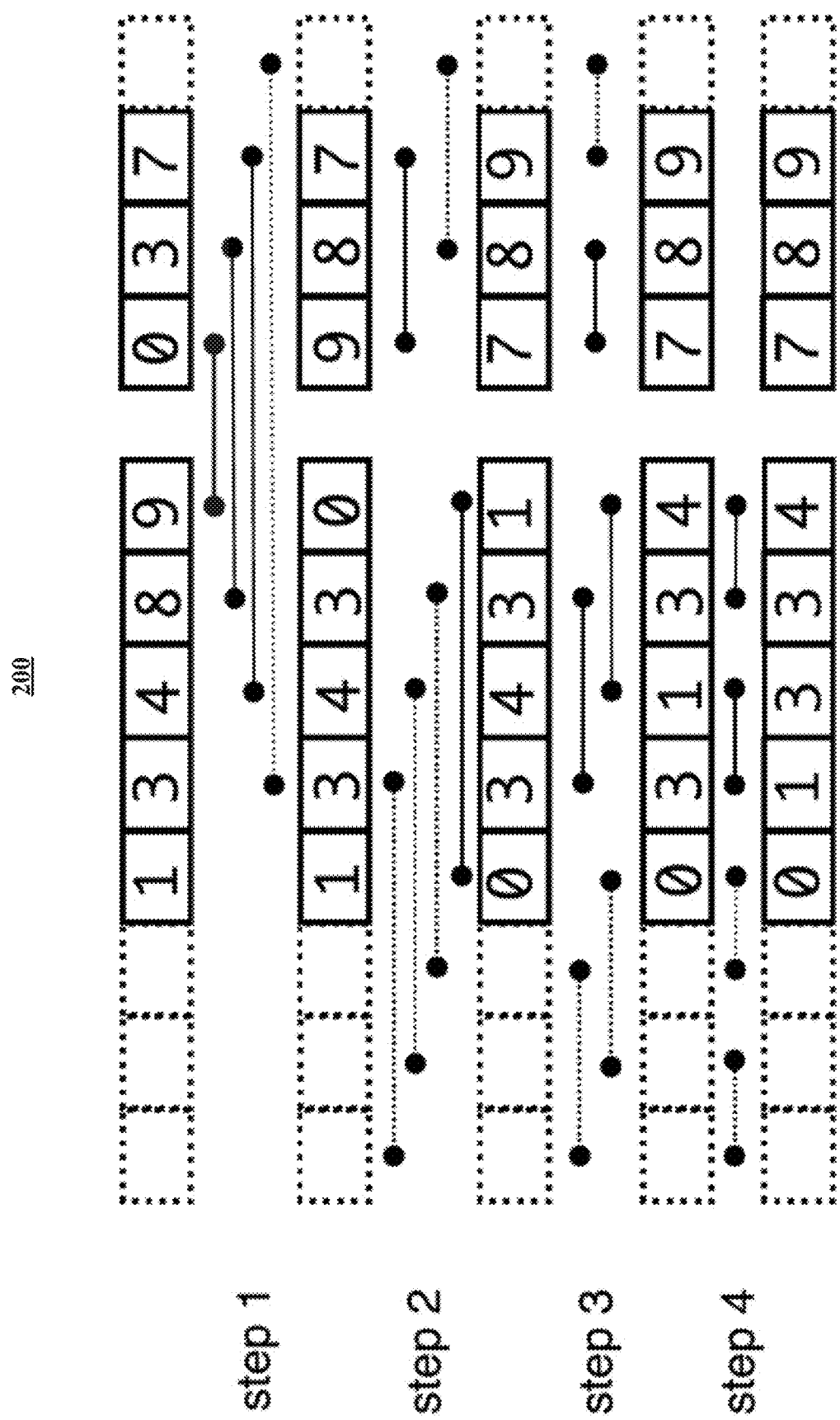
FIG. 2 illustrates an example visualization of an odd-size merging network.

In particular embodiments, algorithm 300 may be derived by considering arrays to be padded to the next highest power-of-2 size with dummy elements that are never swapped (the merge is monotonic) and are already properly positioned; any comparisons with dummy elements may be elided. A left array may be considered to be padded with dummy elements at the start of the array; a right array may have them at the end. In particular embodiments, a merge of two sorted arrays of length $l_1$ and $l_2$ to a sorted array of $l_1+l_2$ may requires $\lceil \lg(\max(l_1, l_2)) \rceil + 1$ parallel steps. FIG. 2 illustrates an example implementation 200 of a merging network of algorithm 300 for arrays of size 5 and 3, with 4 parallel steps.

In particular embodiments, the COMPARE-SWAP may be implemented using warp shuffles on a lane-stride register array. Swaps with a stride a multiple of 32 may occur directly within a lane as the lane holds both elements being compared in registers. Swaps of stride ≤16 or a non-multiple of 32 may occur with warp shuffles, as the values are held by different lanes in potentially different registers. In particular embodiments, array lengths that are multiples of 32 may be used, as they are held in lane-stride arrays.

FIG. 4 illustrates an example algorithm 400 extending the merge to a full sort. In particular embodiments, assuming that there is no sorting structure present in the input data $$\frac{1}{2}(\lceil lg(l) \rceil^2 + \lceil lg(l) \rceil)$$

parallel steps may be required for data of length l.

FIG. 5A illustrates an example algorithm 500a for k-selection. In particular embodiments, algorithm 500a may maintain state entirely in registers and avoid cross-warp synchronization. Algorithm 500a may use merge-odd and sort-odd as primitives. In particular embodiments, algorithm 500a requires only a single pass over the input data. In particular embodiments, algorithm 500a may be used for k≤2048.

In particular embodiments, each warp may be completely independent and may be dedicated to k-selection to a single one of the n arrays $a_i$. In particular embodiments, if n is large enough, a single warp per each $a_i$ will may result in full GPU saturation for a kernel. In particular embodiments, while a single warp applied to a single large input of length n may have low parallelism, decomposition may be used: k-select m arrays of at most $\lceil n/m \rceil$ elements into mk elements, continuing recursively to the final k elements so as to increase parallelism. In particular embodiments, there may be a large enough batch of independent arrays available, which may result in GPU saturation without recursive decomposition.

In particular embodiments, algorithm 500a may work on key/value pairs compared on key. Algorithm 500a may select the k least keys (and their associated values) out of a stream of provided key/value pairs. The key/value pairs may come from scanning memory (for an array $a_i$ stored in memory, the $a_i$ elements may be keys while the indices i may be associated values), or from intermediate computations (e.g., if the implementation is fused into another kernel providing the key/value pairs). In particular embodiments, if $[(k_i, v_i)]_{i=0 \ldots l-1}$ is the sequence of key/value pairs provided for selection, $k_i$ may typically be 16- or 32-bit floating point, and $v_i$ may typically be 32- or 64-bit integers.

In particular embodiments, the key/value pairs may be processed in groups of 32 (e.g., the warp size). Lane i may be responsible for processing $\{(k_i, v_i), (k_{i+32}, v_{i+32}), \ldots\}$, and if the pairs come from global memory, the reads may be contiguous and coalesced into a minimal number of memory transactions. In particular embodiments, the length of the sequence l may not be a multiple of 32 and the remainder may be handled specially.

In particular embodiments, each lane may maintain a small, local queue of t smallest seen key/value pairs held in registers, called the thread queues $[(K_i^T, V_i^T)]_{i=0 \ldots t}$ ordered by key from largest to smallest ($K_i^T \geq K_{i+1}^T$). In particular embodiments, the value of t may be between 2 and 12. In particular embodiments, the value of t may be selected based on the selection size k and the statistics of the input stream. In particular embodiments, a thread queue may act as a first-level filter for new values coming in. If a new $(k_i, v_i)$ is greater than the largest key currently in the queue, then it is guaranteed that it won't be in the k smallest final results.

In particular embodiments, the warp as a whole may share a lane-stride register array of w smallest seen key/value pairs, $[(K_i^W, V_i^W)]_{i=0 \ldots w-1}$, called the warp queue. In particular embodiments, the warp queue may be ordered by key from smallest to largest ($K_i^W \leq K_{i+1}^W$). In particular embodiments, the value of w may be a multiple of 32, k≤w. In particular embodiments, the value of w may selected to be the smallest multiple of 32 above k. In particular embodiments, the value of w may be selected to be a power-of-2 from 32 to 2048. This may be a second level data structure that will be used to maintain all of the k smallest warp-wide seen values. In particular embodiments, both the thread and warp queues may be initialized to maximum sentinel values (e.g., the pair (FLT_MAX, -1)). In particular embodiments, the warp queue may be a wavefront queue.

In particular embodiments, the following three invariants may be maintained:
  all per-lane $K_0^T$ are not in the min-k
  all per-lane $K_0^T$ are greater than all warp queue keys $K_i^W$
  all $(k_i, v_i)$ seen so far in the min-k are contained in either some lane's thread queue ($K_1^T$ to $K_{t-1}^T$), or in the warp queue.

In particular embodiments, a lane upon receiving a new $(k_i, v_i)$ may attempt to insert it into its thread queue. If $k_i > K_0^T$, then the new pair may be by definition not in the k minimum, and may be rejected. Otherwise, it may be inserted into its proper sorted position in the thread queue, thus ejecting the old ($K_0^T$ to $V_0^T$). All lanes may complete doing this with their new received pair and their thread queue, but it is now possible that the second invariant has been violated. Up to this point, there may have been no cross-lane communication. Using the warp ballot instruction, it may be determined if any lane has violated the second invariant, and the entire warp know may receive this information. If the second invariant has not been violated, then new elements may be continued to be processed.

In particular embodiments, the thread queue may be a temporary buffer of potential min-k pairs; each time a new pair is encountered, if it is in fact in the real min-k and can be safely kept in a thread queue without disturbing the invariants, then processing may continue.

In particular embodiments, if the warp ballot indicates that any lane has its invariant violated, then the warp may use odd-merge to merge and sort the thread and warp queues together. The new warp queue may be the min-w elements across the merged, sorted queues, and the new thread queues may be the remainder, from min-(w+1) to min-(w+32t+1). This may restore the invariants and processing of subsequent elements may be continued.

In particular embodiments, algorithm 500a may be used to perform k-selection for maximum values. As an example and not by way of limitation, the thread queues may store the largest seen key/value pairs held in registers, the thread queues may be ordered from smallest to largest, inserting a new $(k_i, v_i)$ pair may be done if it is smaller than the smallest value currently in the queue, the warp queue may store the largest key/value pairs, and the warp queue may be ordered from largest to smallest. a lane upon receiving a new $(k_i, v_i)$ may attempt to insert it into its thread queue. If $k_i < K_0^T$, then the new pair may be by definition not in the k maximum, and may be rejected. Otherwise, it may be inserted into its proper sorted position in the thread queue, thus ejecting the old $(K_0^T$ to $V_0^T)$. After using an odd-merge to sort the thread and warp queues together, the warp queue may be the max-w elements across the merged, sorted queues, and the new thread queues may be the remainder, from max-(w+1) to max-(w+32t+1).

In particular embodiments, since the thread and warp queues may already be sorted, some merging steps used in a full sort may be avoided; one sorted array of length w with 32 sorted arrays of length t may be merged instead. In particular embodiments, Batcher's formulation may require that 32t=w and is a power-of-2; thus if k=1024, t must be 32. This may require an in-register insertion sort into an array of 32 elements for every new element encountered, which may be expensive.

In particular embodiments, using odd-merge to merge the 32 already sorted thread queues may require a struct-of-arrays (SoA) to array-of-structs (AoS) transposition in registers across the warp, since the t successive sorted values may be held in different registers in the same lane rather than a lane-stride array. In particular embodiments, this may be possible using warp shuffles and permutation math or shared memory. In particular embodiments, the thread queue registers may be reinterpreted as an (unsorted) lane-stride array and sorted from scratch. In particular embodiments, odd-merge may be used for the final step of merging the aggregate sorted thread queues with the warp queue.

In particular embodiments, the input 1 may be a multiple of 32, and if there is a remainder set of elements, those may be individually inserted into the thread queue for those lanes that have data, and then the entire warp may perform the ballot and perform the sort if any of the active lanes for the remainder violated their invariants.

In particular embodiments, after processing all elements and performing a final sort of the thread and warp queues together, the warp queue may be left with all min-k keys and values.

Figure 5B:
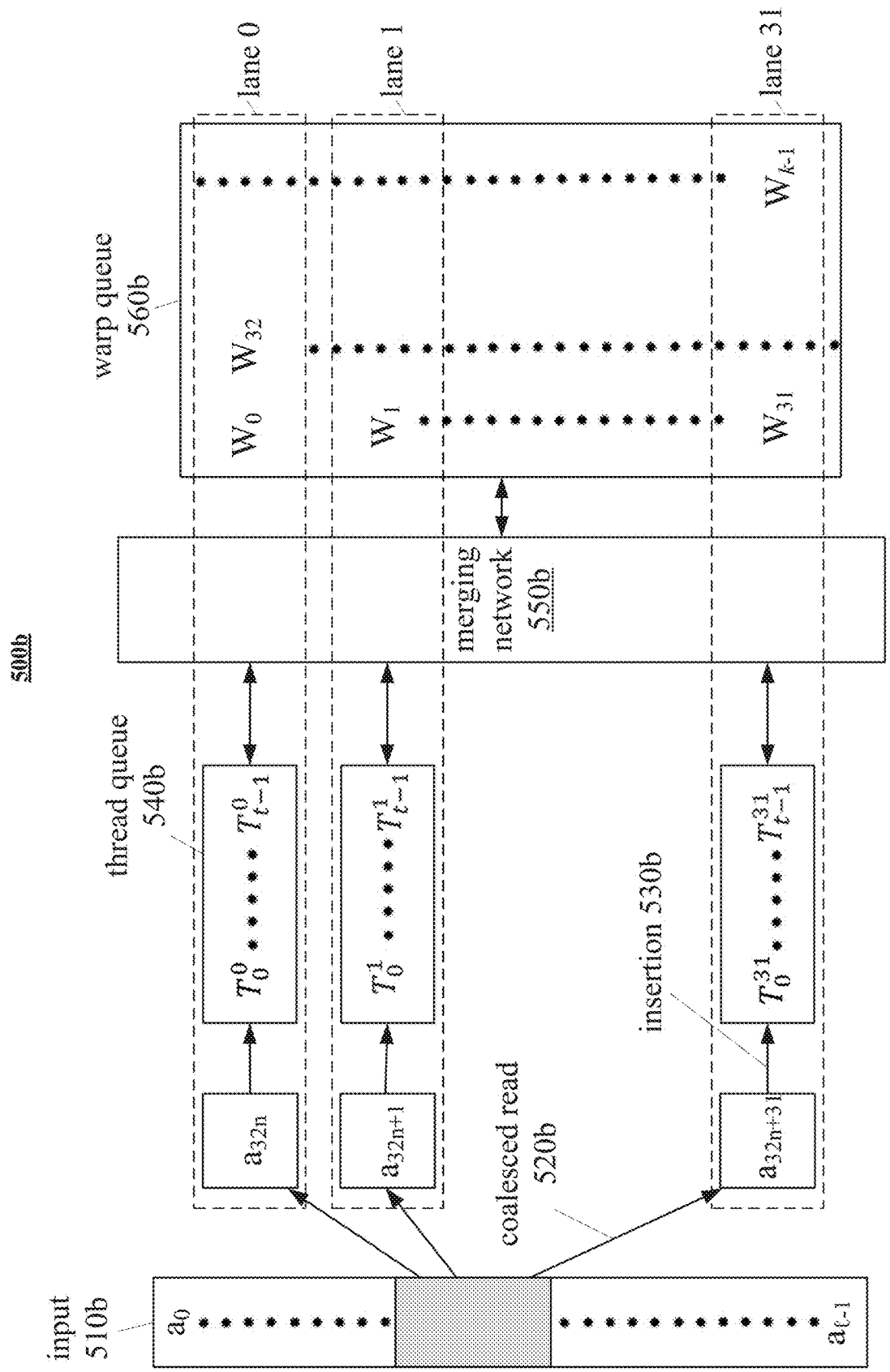
FIG. 5B illustrates an example block diagram for k-selection.

In particular embodiments, algorithm 500a may have one or more of the following properties:
  All state may be maintained in registers with no shared memory usage
  No inter-warp synchronization may be used
  Multiple kernel launches may not be needed, and may be directly fusable into other kernels
  Only two levels of queues may be maintained
  Odd-size sorting and merging networks may be used
  Arbitrary data types may be supported FIG. 5B illustrates an example block diagram 500b for k-selection. In particular embodiments, the elements of input stream 510b may be processed in groups of 32, which may correspond to the warp size. In particular embodiments, if the elements come from global memory, the reads may be contiguous and coalesced into a minimal number of memory transactions (e.g., by a coalesced read 520b). Each lane (e.g., lane 0, lane 1, and lane 32) may maintain a thread queue 540b. Values from the input stream may be input into a thread queue using the process described above (e.g., insertion 530b). Warp queue 560b may share a lane-stride register array of the k smallest (or largest) elements warp-wide. When an invariant is violated, the warp may use merging network 550b to merge and sort the thread queues 540b and the warp queue 560b together.

In particular embodiments, each t and w value may require a separate compilation of the code. In particular embodiments, values $w=2^a$, $5 \leq a \leq 11$ may be used. As an example and not by way of limitation, if k=400, then $w=2^9$ may be used.

In particular embodiments, performance may be subject to input statistics. In particular embodiments, the choice of t for a given w may be made by experiment on typical k-nearest neighbors algorithm (k-NN) data, as this parameter may balance fixed per-thread overhead against frequency of warp-wide sorting.

In particular embodiments, the exhaustive search method may be used in the first-level quantization. As stated above, the distance computation may boil down to a matrix multiplication. In particular embodiments, this may be performed using the optimized Basic Linear Algebra Subroutines (BLAS) routine provided by NVIDIA (cuBLAS).

In particular embodiments, the distance matrix D may not fit in GPU memory. The problem may be tiled over the batch of queries, with $t_q \leq n_q$ queries being run in a single tile. In particular embodiments, k-selection on the linear distance array for each tile may be performed after distance calculation. Each of the $$\left\lceil \frac{n_q}{t_q} \right\rceil$$

tiles may be independent problems, but two may be run in parallel on different streams to better saturate the GPU. The computation may be tiled over N.

In particular embodiments, the IVFADC may require computing the distance from a vector to a set of product-quantization reproduction values. By developing the equation $$L_{IVFADC} = \underset{i=1\ldots N \, st. q_1(y_i) \in L_{IVF}}{k - \text{argmin}} \|x - q(y_i)\|_2$$

for a database vector y, the following may be obtained:

$$\|x-q(y)\|_2^2 = \|x-q_1(y)-q_2(y-q_1(y_y))\|_2^2$$

The residual vectors left after $q_1$ may be decomposed as $$y-q_1(y)=[\widetilde{y^1} \ldots \widetilde{y^1}] \text{ and}$$

$$x-q_1(y)=[\widetilde{x^1} \ldots \widetilde{x^b}]$$

The distance may be rewritten as $$\|x-q(y)\|_2^2 = \|\widetilde{x^1}-q^1(\widetilde{y^1})\|_2^2 + \ldots + \|\widetilde{x^b}-q_b(\widetilde{y^1})\|_2^2$$

In particular embodiments, each quantizer $q^1, \ldots, q^b$ may have 256 reproduction values, so when x and $q_1(y)$ are known all distances may be precomputed and stored in tables $T_1, \ldots, T_b$ of size 256. Computing the sum $$\|x-q(y)\|_2^2 = \|\widetilde{x^1} - q^1(\widetilde{y^1})\|_2^2 + \ldots + \|\widetilde{x^b} - q_b(\widetilde{y^1})\|_2^2$$

may boil down to b look-ups and additions. In particular embodiments, the costs may be compared as:

Explicit computation: n×d multiply-adds

With lookup tables: 256×d multiply-adds and n×b lookup-adds

In particular embodiments, b may be any power of 2 from $2^0$ to $2^6$. The codes may be stored as sequential groups of b bytes in each inverted list. In particular embodiments, when scanning over the elements of inverted list $\mathcal{I}_l$ where $q_1(y)=l$, the method with the look-up tables may be applied.

In particular embodiments, the computation of the tables $T_1 \ldots T_b$ may be further optimized. The expression of $\|x-q(y)\|_2^2$ may be decomposed into:

$$\underbrace{\|q_2(\ldots)\|_2^2 + 2\langle q_1(y), q_2(\ldots)\rangle\|}_{term\,1} + \underbrace{\|x - q_1(y)\|_2^2}_{term\,2} - \underbrace{2\langle x, q_2(\ldots)\rangle}_{term\,3}$$

In particular embodiments, the objective may be to minimize the computations in the inner loop. In particular embodiments, one or more of the following computations may be done in advance and results of which may be stored in lookup tables:

term 1 is independent of the query, so it may be precomputed from the quantizers, and stored in a tablet of size $|\mathcal{C}_1| \times 256 \times b$;

term 2 is the distance to $q_1$'s reproduction value. It may be a by-product of the first-level quantizer $q_1$;

term 3 may be computed independently of the inverted list. Its computation may cost d×256 multiply-adds.

This decomposition may be used to produce the lookup tables $T_1, \ldots, T_b$. For a single query, the naive algorithm to produce the τ×b tables may cost τ×d×256 multiply-adds, while this decomposition may cost 256×d multiply-adds and τ×b×256 additions. In particular embodiments, this decomposition may be used on a CPU. In particular embodiments, this decomposition may be used on a GPU. In particular embodiments, this decomposition may be used on a GPU only when memory is a not a concern.

FIG. 6 illustrates an example algorithm 600 for inverted file with product quantization (IVFPQ) indexing with the three loop levels. The inverted lists may be stored as two separate arrays. One may contain the product quantization (PQ) codes, the second the associated IDs. In particular embodiments, IDs may be looked up only if the k-selection finds that the vector is in the k nearest neighbors. This lookup may yield a few sparse memory reads in a large array, therefore the IDs may be stored on CPU.

In connection with quantizing or indexing, particular embodiments may utilize one or more systems, components, elements, functions, methods, operations, or steps disclosed in U.S. patent application Ser. No. 15/393,926, filed 29 Dec. 2016, which is incorporated by reference.

In particular embodiments, a kernel may be responsible for scanning the τ closest inverted lists for each query, and calculating the per-vector pair distances using the lookup tables $T_i$. The $T_i$ may be stored in shared memory: up to $n_q \times \tau \times \max_i |\mathcal{I}_i| \times b$ lookups may be required for a query set (trillions of accesses in practice), and may be random access. This may limit b to at most 48 (32-bit floating point) or 96 (16-bit floating point).

In particular embodiments, each $n_q \times \tau$ pairs of query against inverted list can be processed independently. In particular embodiments, one extreme may be a block being dedicated to each of these, resulting in up to $n_q \times \tau \times \max_i |\mathcal{I}_i|$ partial results being written back to global memory, which is then k-selected to $n_q \times \tau$ final results. This may result in high parallelism but may exceed available GPU global memory; as with exact search computation, a tile size $t_q \leq n_q$ may be used to reduce memory consumption, with two tiles on different streams, which may bound memory consumption by $\mathcal{O}(t_q \tau \max_i |\mathcal{I}_i|)$.

In particular embodiments, a single warp may be dedicated to k-selection of each $t_q$ set of lists, which may result in low parallelism. In particular embodiments, a two-pass k-selection may be used, which may reduce $t_q \times \tau \times \max_i |\mathcal{I}_i|$ to $t_q \times f \times k$ partial results for some subdivision factor f. This may be reduced again via k-selection to the final $t_q \times k$ results.

In particular embodiments, a fused kernel may dedicate a single block to scanning all τ lists for a single query. In particular embodiments, k-selection via algorithm 500a may be performed after each distance computation in the same kernel. In particular embodiments, kernel fusion for k-selection may be used in cases of lower overhead for intermediate result output.

Figure 7:
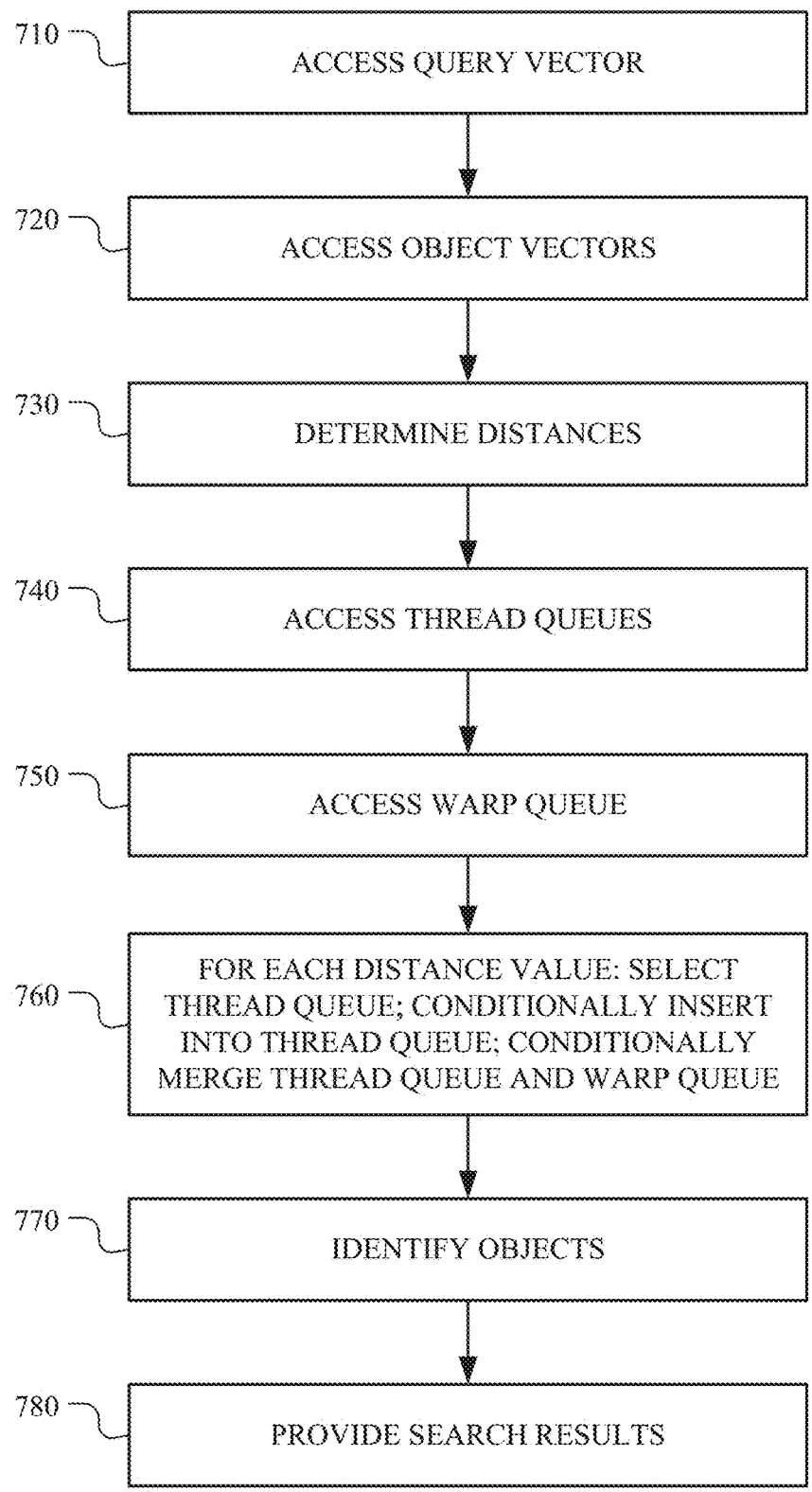
FIG. 7 illustrates an example method for k-selection

FIG. 7 illustrates an example method 700 for k-selection. The method may begin at step 710, where social-networking system 860 may access a query vector representing a search query entered by a user. At step 720, social-networking system 860 may access a plurality of object vectors that each represent one of a plurality of objects. At step 730, social-networking system 860 may determine plurality of input distance values that each correspond to a distance between the query vector and one of the object vectors. At step 740, social-networking system 860 may access a plurality of thread queues that initially store thread-queue maximum sentinel distance values. At step 750, social-networking system 860 may access a warp queue that initially stores warp-queue maximum sentinel distance values. At step 760, social-networking system 860 may for each of the input distance values: select one of the thread queues; when the input distance value is less than a greatest one of the distance values stored in the selected one of the thread queues, insert the input distance value into the selected one of the thread queues and eject the greatest one of the distance values stored in the selected one of the thread queues; and when a greatest one of the distance values stored in any of the thread queues is less than a greatest one of the distance values stored in the warp queue, merge the thread queue with the warp queue using an odd-size merging network. At step 770, social-networking system 860 may identify the objects represented by an object vector corresponding to the distance values stored in the warp queue. At step 780, social-networking system 860 may provide for presentation to the user one or more search results corresponding to one or more of the identified objects. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for k-selection including the particular steps of the method of FIG. 7, this disclosure contemplates any suitable method for k-selection including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
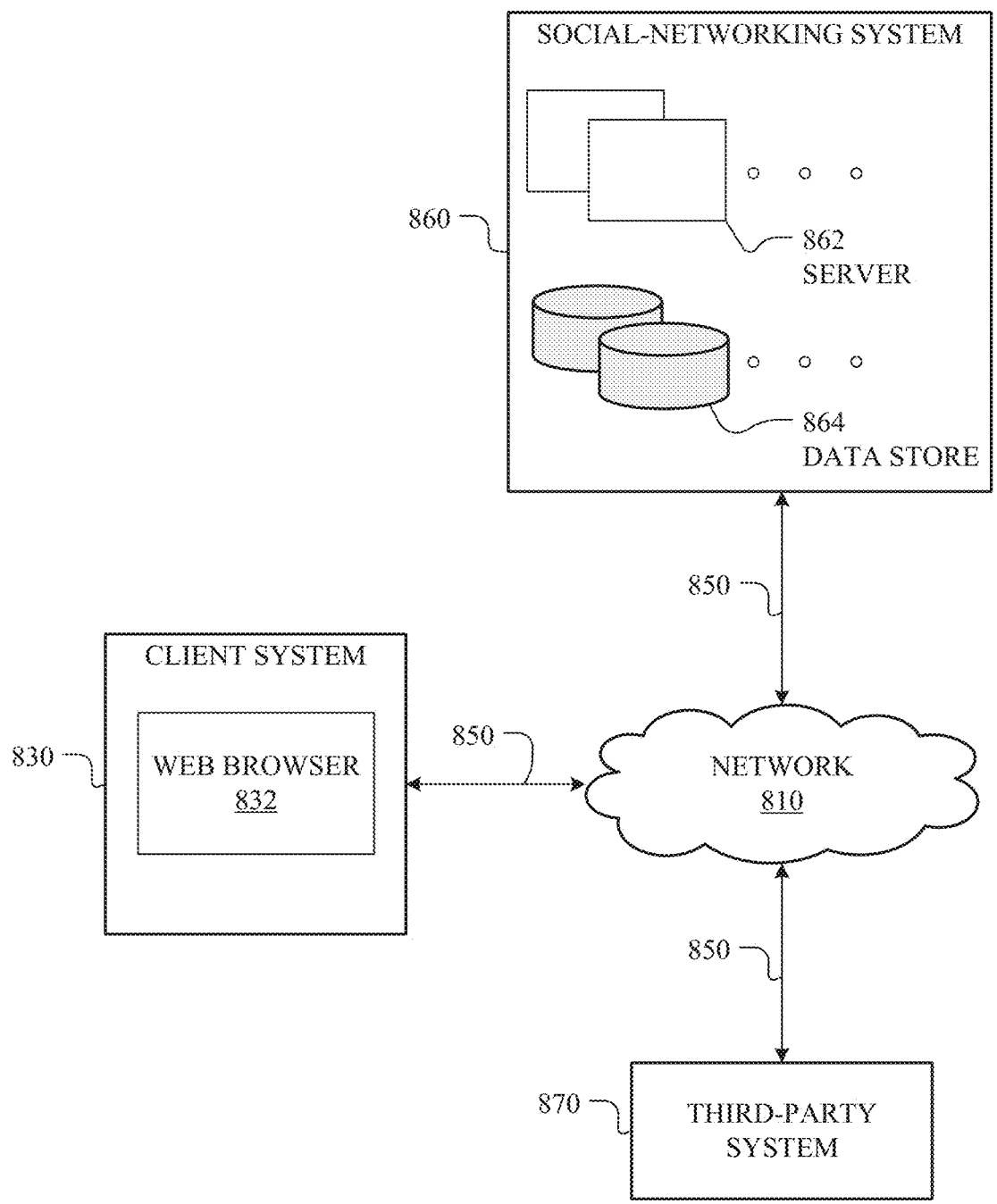
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, a client system 830 may include a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
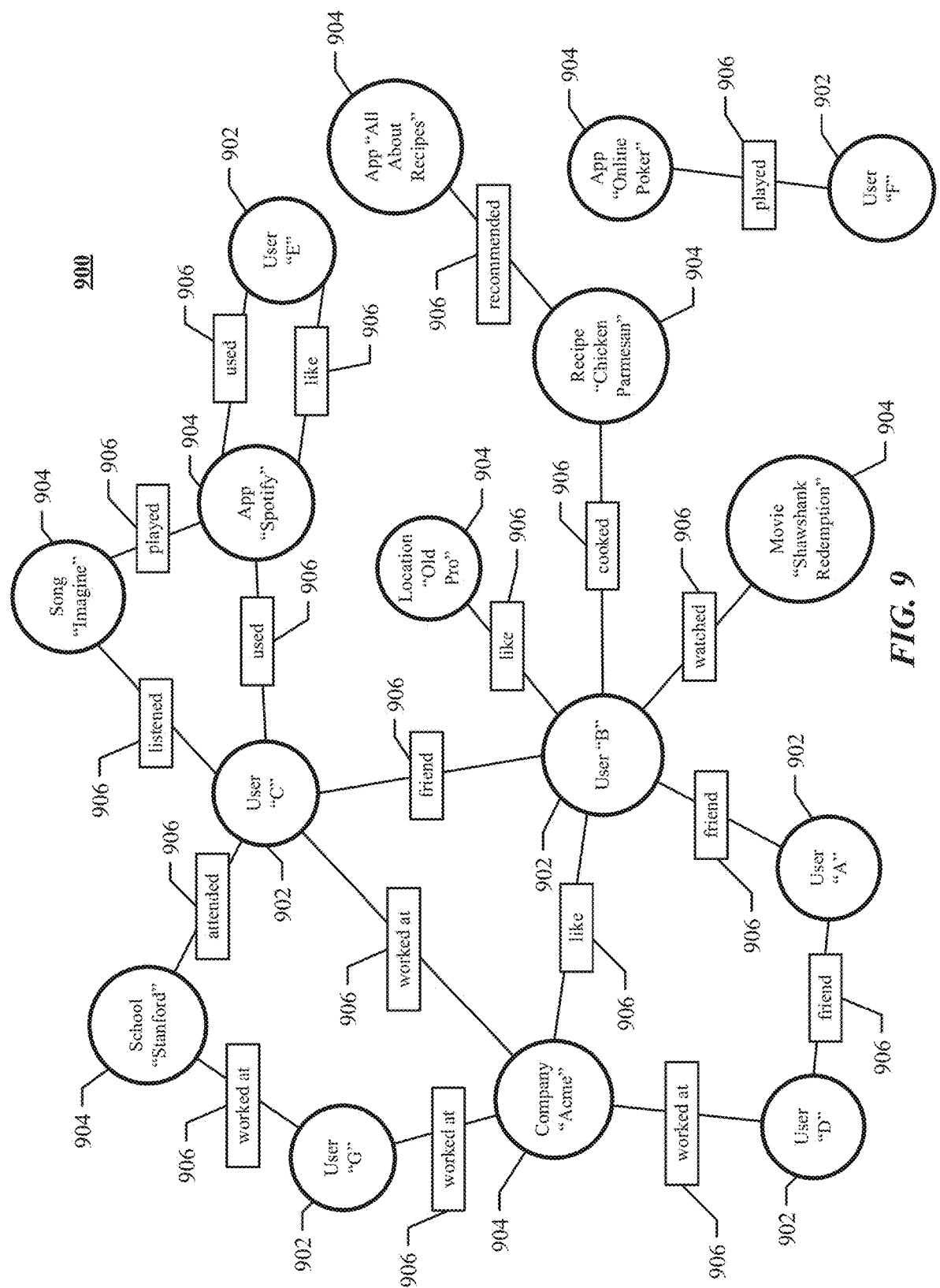
FIG. 9 illustrates an example social graph.

FIG. 9 illustrates example social graph 900. In particular embodiments, social-networking system 860 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more web interfaces.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more web interfaces.

In particular embodiments, a node in social graph 900 may represent or be represented by a web interface (which may be referred to as a "profile interface"). Profile interfaces may be hosted by or accessible to social-networking system 860. Profile interfaces may also be hosted on third-party websites associated with a third-party system 870. As an example and not by way of limitation, a profile interface corresponding to a particular external web interface may be the particular external web interface and the profile interface may correspond to a particular concept node 904. Profile interfaces may be viewable by all or a selected subset of other users. As an example and not by way of limitation, a user node 902 may have a corresponding user-profile interface in which the corresponding user may add content, make declarations, or otherwise express himself or herself. As another example and not by way of limitation, a concept node 904 may have a corresponding concept-profile interface in which one or more users may add content, make declarations, or express themselves, particularly in relation to the concept corresponding to concept node 904.

In particular embodiments, a concept node 904 may represent a third-party web interface or resource hosted by a third-party system 870. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 830 to send to social-networking system 860 a message indicating the user's action. In response to the message, social-networking system 860 may create an edge (e.g., a check-in-type edge) between a user node 902 corresponding to the user and a concept node 904 corresponding to the third-party web interface or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile interface corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 860 may create an edge 906 between a user node 902 and a concept node 904 in social graph 900. As an example and not by way of limitation, a user viewing a concept-profile interface (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile interface. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, the social-networking system 860 may receive, from a client system of a user of an online social network, a query inputted by the user. The user may submit the query to the social-networking system 860 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 860 that matches the text query. The social-networking system 860 may then search a data store 864 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 902, concept nodes 904, edges 906), profile interfaces, external web interfaces, or any combination thereof. The social-networking system 860 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 860 may then send the search-results interface to the web browser 832 on the user's client system 830. The user may then click on the URL links or otherwise select the content from the search-results interface to access the content from the social-networking system 860 or from an external system (such as, for example, a third-party system 870), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 870, the internet or World Wide Web, or other suitable sources. Although this disclosure describes querying the social-networking system 860 in a particular manner, this disclosure contemplates querying the social-networking system 860 in any suitable manner.

In particular embodiments, one or more client-side and/or backend (server-side) processes may implement and utilize a "typeahead" feature that may automatically attempt to match social-graph elements (e.g., user nodes 902, concept nodes 904, or edges 906) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 860. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 900. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 860. In particular embodiments, the typeahead process may use one or more matching algorithms to attempt to identify matching social-graph elements. In particular embodiments, when a match or matches are found, the typeahead process may send a response to the user's client system 830 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 902 or concept nodes 904, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 902, concept nodes 904, or edges 906 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 902, concept nodes 904, edges 906) having respective names, types, categories, or other identifiers matching the entered text. The typeahead process may use one or more matching algorithms to attempt to identify matching nodes or edges. When a match or matches are found, the typeahead process may send a response to the user's client system 830 that may include, for example, the names (name strings) of the matching nodes as well as, potentially, other metadata associated with the matching nodes. The typeahead process may then display a drop-down menu that displays names of matching existing profile interfaces and respective user nodes 902 or concept nodes 904, and displays names of matching edges 906 that may connect to the matching user nodes 902 or concept nodes 904, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 860 of the user's confirmation of a query containing the matching social-graph elements. In response to the request sent, the social-networking system 860 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

In particular embodiments, in response to a text query received from a first user (i.e., the querying user), the social-networking system 860 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 860 may access a social graph 900 and then parse the text query to identify the social-graph elements that corresponded to ambiguous n-grams from the text query. The social-networking system 860 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 860 may generate a structured query "Friends of Stephanie," where "Friends" and "Stephanie" in the structured query are references corresponding to particular social-graph elements. The reference to "Stephanie" would correspond to a particular user node 902 (where the social-networking system 860 has parsed the n-gram "my girlfriend" to correspond with a user node 902 for the user "Stephanie"), while the reference to "Friends" would correspond to friend-type edges 906 connecting that user node 902 to other user nodes 902 (i.e., edges 906 connecting to "Stephanie's" first-degree friends). When executing this structured query, the social-networking system 860 may identify one or more user nodes 902 connected by friend-type edges 906 to the user node 902 corresponding to "Stephanie". As another example and not by way of limitation, in response to the text query, "friends who work at facebook," the social-networking system 860 may generate a structured query "My friends who work at Facebook," where "my friends," "work at," and "Facebook" in the structured query are references corresponding to particular social-graph elements as described previously (i.e., a friend-type edge 906, a work-at-type edge 906, and concept node 904 corresponding to the company "Facebook"). By providing suggested structured queries in response to a user's text query, the social-networking system 860 may provide a powerful way for users of the online social network to search for elements represented in the social graph 900 based on their social-graph attributes and their relation to various social-graph elements. Structured queries may allow a querying user to search for content that is connected to particular users or concepts in the social graph 900 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

In particular embodiments, the social-networking system 860 may provide customized keyword completion suggestions to a querying user as the user is inputting a text string into a query field. Keyword completion suggestions may be provided to the user in a non-structured format. In order to generate a keyword completion suggestion, the social-networking system 860 may access multiple sources within the social-networking system 860 to generate keyword completion suggestions, score the keyword completion suggestions from the multiple sources, and then return the keyword completion suggestions to the user. As an example and not by way of limitation, if a user types the query "friends stan," then the social-networking system 860 may suggest, for example, "friends stanford," "friends stanford university," "friends stanley," "friends stanley cooper," "friends stanley kubrick," "friends stanley cup," and "friends stanlonski." In this example, the social-networking system 860 is suggesting the keywords which are modifications of the ambiguous n-gram "stan," where the suggestions may be generated from a variety of keyword generators. The social-networking system 860 may have selected the keyword completion suggestions because the user is connected in some way to the suggestions. As an example and not by way of limitation, the querying user may be connected within the social graph 900 to the concept node 904 corresponding to Stanford University, for example by like- or attended-type edges 906. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Figure 10:
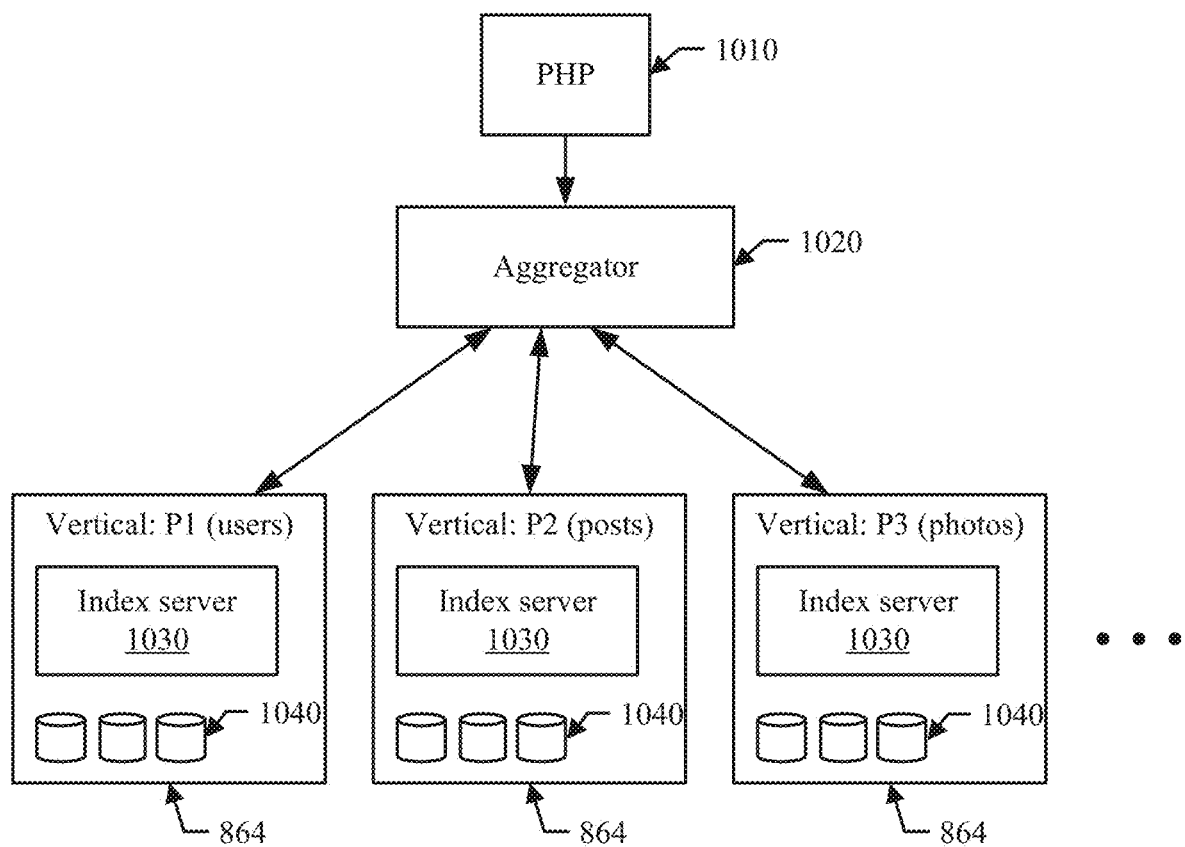
FIG. 10 illustrates an example partitioning for storing objects of a social-networking system.

FIG. 10 illustrates an example partitioning for storing objects of a social-networking system 860. A plurality of data stores 864 (which may also be called "verticals") may store objects of social-networking system 860. The amount of data (e.g., data for a social graph 900) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 860 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 900. An edge 906 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 860 may update the search index of the data store based on newly received objects, and relationships associated with the received objects.

In particular embodiments, each data store 864 may be configured to store objects of a particular one of a plurality of object-types in respective data storage devices 1040. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 10 may store user objects. Each user object stored in the user vertical P1 may comprise an identifier (e.g., a character string), a user name, and a profile picture for a user of the online social network. Social-networking system 860 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 10 may store post objects. Each post object stored in the post vertical P2 may comprise an identifier, a text string for a post posted to social-networking system 860. Social-networking system 860 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 860 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 1040.

In particular embodiments, objects stored in each vertical 864 may be indexed by one or more search indices. The search indices may be hosted by respective index server 1030 comprising one or more computing devices (e.g., servers). The index server 1030 may update the search indices based on data (e.g., a photo and information associated with a photo) submitted to social-networking system 860 by users or other processes of social-networking system 860 (or a third-party system). The index server 1030 may also update the search indices periodically (e.g., every 24 hours). The index server 1030 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 860 may receive a search query from a PHP (Hypertext Preprocessor) process 1010. The PHP process 1010 may comprise one or more computing processes hosted by one or more servers 862 of social-networking system 860. The search query may be a text string or a search query submitted to the PHP process by a user or another process of social-networking system 860 (or third-party system 170). In particular embodiments, an aggregator 1020 may be configured to receive the search query from PHP process 1010 and distribute the search query to each vertical. The aggregator may comprise one or more computing processes (or programs) hosted by one or more computing devices (e.g. servers) of the social-networking system 860. Particular embodiments may maintain the plurality of verticals 864 as illustrated in FIG. 10. Each of the verticals 864 may be configured to store a single type of object indexed by a search index as described earlier. In particular embodiments, the aggregator 1020 may receive a search request. For example, the aggregator 1020 may receive a search request from a PHP (Hypertext Preprocessor) process 1010 illustrated in FIG. 9. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 1020 may determine one or more search queries based on the received search request. In particular embodiments, each of the search queries may have a single object type for its expected results (i.e., a single result-type). In particular embodiments, the aggregator 1020 may, for each of the search queries, access and retrieve search query results from at least one of the verticals 864, wherein the at least one vertical 864 is configured to store objects of the object type of the search query (i.e., the result-type of the search query). In particular embodiments, the aggregator 1020 may aggregate search query results of the respective search queries. For example, the aggregator 1020 may submit a search query to a particular vertical and access index server 1030 of the vertical, causing index server 1030 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723, 861, filed 21 Dec. 2012, and U.S. patent application Ser. No. 13/870,113, filed 25 Apr. 2013, each of which is incorporated by reference.

Figure 11:
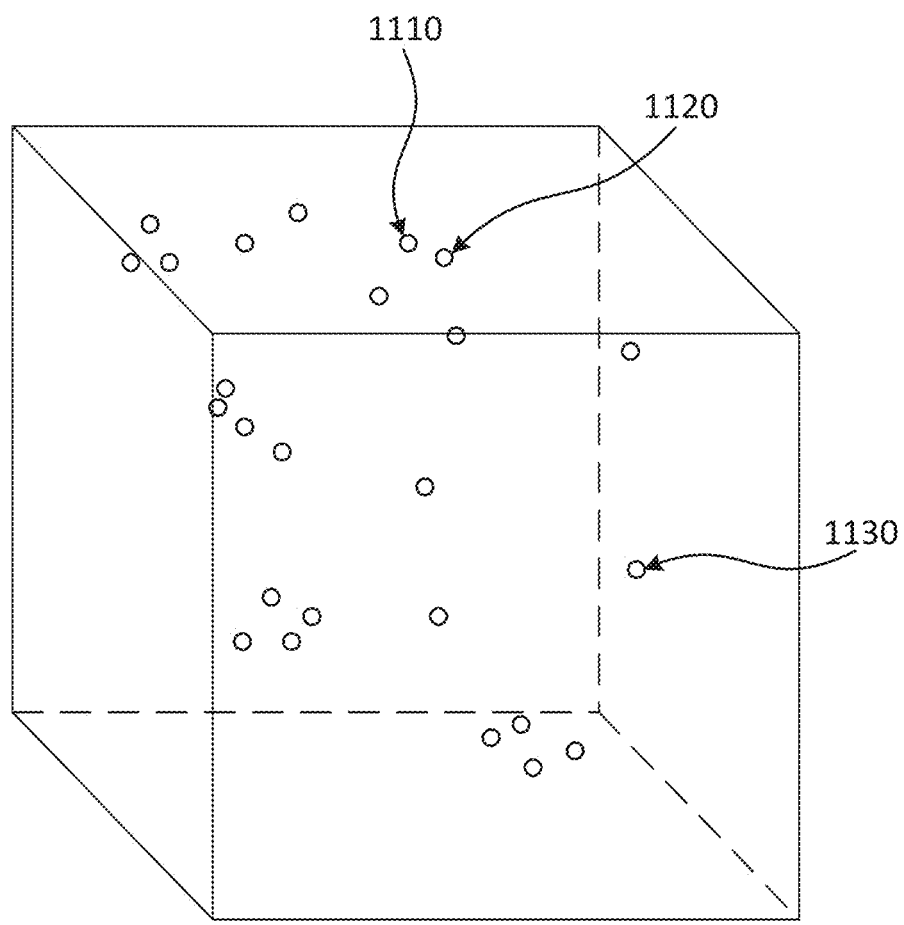
FIG. 11 illustrates an example view of a vector space.

FIG. 11 illustrates an example view of a vector space 1100. Vector space 1100 may also be referred to as a feature space or an embedding space. In particular embodiments, an object or an n-gram may be represented in a d-dimensional vector space, where d denotes any suitable number of dimensions. An object may represent data, such as audio data or video data. Although the vector space 1100 is illustrated as a three-dimensional space, this is for illustrative purposes only, as the vector space 1100 may be of any suitable dimension. In particular embodiments, an object may be represented in the vector space 1100 as a feature vector. A feature vector may also be referred to as an embedding. Each vector may comprise coordinates corresponding to a particular point in the vector space 1100 (i.e., the terminal point of the vector). As an example and not by way of limitation, feature vectors 1110, 1120, and 1130 may be represented as points in the vector space 1100, as illustrated in FIG. 11. An object may be mapped to a respective vector representation. As an example and not by way of limitation, objects $t_1$ and $t_2$ may be mapped to feature vectors $\vec{v_1}$ and $\vec{v_2}$ in the vector space 1100, respectively, by applying a function $\vec{\pi}$. The function $\vec{\pi}$ may map objects to feature vectors by feature extraction, which may start from an initial set of measured data and build derived values (e.g., features). When an object has data that is either too large to be efficiently processed or comprises redundant data, $\vec{\pi}$ may map the object to a feature vector using a transformed reduced set of features (e.g., feature selection). A feature vector may comprise information related to the object. In particular embodiments, an object may be mapped to a feature vector based on one or more properties, attributes, or features of the object, relationships of the object with other objects, or any other suitable information associated with the object. As an example and not by way of limitation, an object comprising a video or an image may be mapped to a vector representation in the vector space 1100 by using an algorithm to detect or isolate various desired portions or shapes of the object. Features of the feature vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a feature vector based on features such as a spectral slope, a tonality coefficient, an audio spectrum centroid, an audio spectrum envelope, a Mel-frequency cepstrum, or any other suitable information. In particular embodiments, an n-gram may be mapped to a feature vector by a dictionary trained to map text to a feature vector. As an example and not by way of limitation, a model, such as Word2vec, may be used to map an n-gram to a feature vector. In particular embodiments, feature vectors or embeddings may be robust to basic changes like text addition or changes to aspect ratio. In particular embodiments, social-networking system 860 may map objects of different modalities (e.g., visual, audio, text) to a particular vector space or using a separate function. In particular embodiments, social-networking system 860 may map objects of different modalities to the same vector space or use a function jointly trained to map one or more modalities to a feature vector (e.g., between visual, audio, text). Although this disclosure describes representing an object or an n-gram in a vector space in a particular manner, this disclosure contemplates representing an object or an n-gram in a vector space in any suitable manner.

In particular embodiments, social-networking system 860 may calculate a similarity metric of feature vectors in vector space 1100. A similarity metric may be a cosine similarity, a Minkowski distance, a Mahalanobis distance, a Jaccard similarity coefficient, or any other suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two feature vectors may represent how similar the two objects corresponding to the two feature vectors, respectively, are to one another, as measured by the distance between the two feature vectors in the vector space 1100. As an example and not by way of limitation, feature vector 1110 and feature vector 1120 may correspond to video-content objects that are more similar to one another than the video-content objects corresponding to feature vector 1110 and feature vector 1130, based on the distance between the respective feature vectors. In particular embodiments, social-networking system 860 may determine a cluster of vector space 1100. A cluster may be a set of one or more points corresponding to feature vectors of objects or n-grams in vector space 1100, and the objects or n-grams whose feature vectors are in the cluster may belong to the same class or have some semantic relationship to one another. As an example and not by way of limitation, a cluster may correspond to sports-related content and another cluster may correspond to food-related content. Although this disclosure describes calculating similarity metrics in a particular manner, this disclosure contemplates calculating similarity metrics in any suitable manner.

More information on vector spaces, embeddings, feature vectors, and similarity metrics may be found in U.S. patent application Ser. No. 14/949,436, filed 23 Nov. 2015, U.S. patent application Ser. No. 14/981,413, filed 28 Dec. 2015, U.S. patent application Ser. No. 15/286,315, filed 5 Oct. 2016, and U.S. patent application Ser. No. 15/365,789, filed 30 Nov. 2016, each of which is incorporated by reference.

Figure 12:
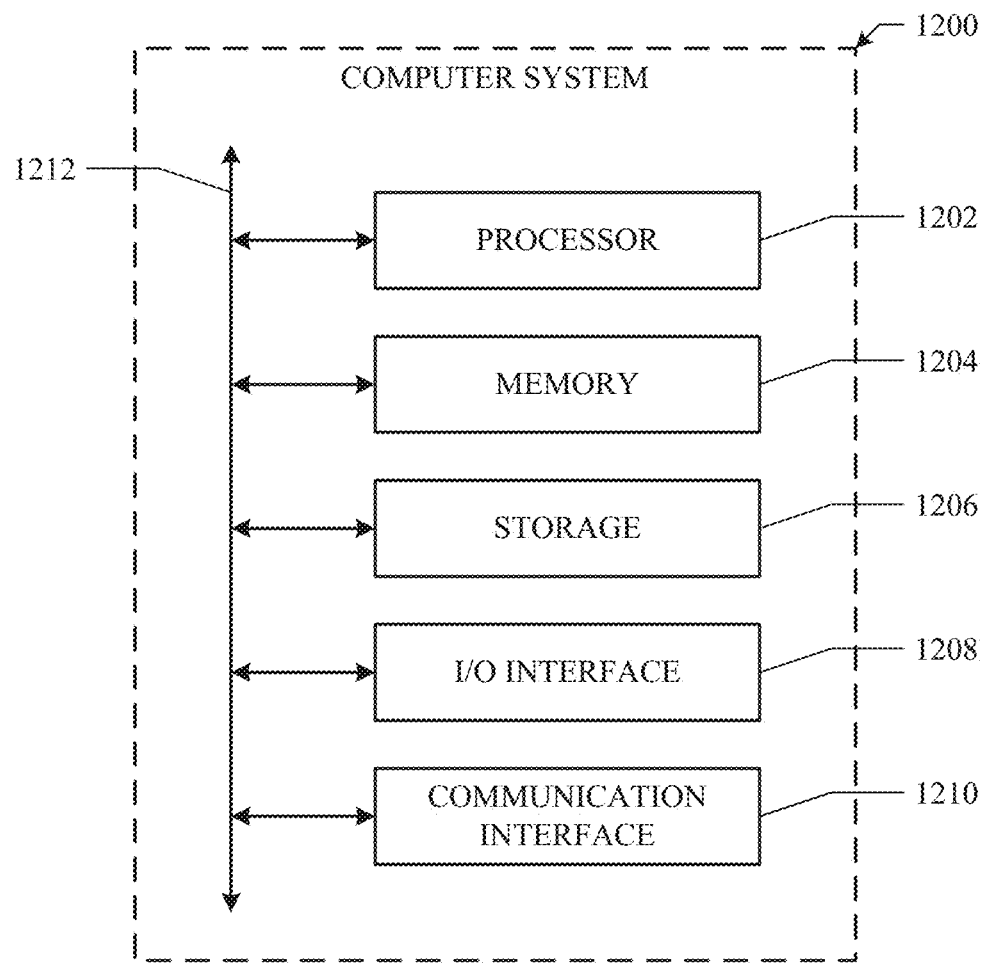
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
by one or more computing devices, accessing a query vector representing a search query entered by a user;
by one or more computing devices, accessing a plurality of object vectors that each represent one of a plurality of objects;
by one or more computing devices, determining plurality of input distance values that each correspond to a distance between the query vector and one of the object vectors;
by one or more computing devices, accessing a plurality of thread queues that initially store thread-queue distance values;
by one or more computing devices, accessing a plurality of warp queues in a block, wherein:
the warp queues initially store warp-queue distance values; and
the block further comprises shared memory for the warp queues;
by one or more computing devices, for each of the input distance values:
selecting one of the warp queues;
selecting one of the thread queues corresponding to the selected one of the warp queues;
when the input distance value is less than a greatest one of the distance values stored in the selected one of the thread queues, inserting the input distance value into the selected one of the thread queues and ejecting the greatest one of the distance values stored in the selected one of the thread queues; and
when a greatest one of the distance values stored in any of the thread queues is less than a greatest one of the distance values stored in the selected one of the warp queues, merging, within the shared memory in the block, the selected one of the thread queues with the selected one of the warp queues using an odd-size merging network in parallel with one or more other thread queues corresponding to the selected one of the warp queues;
by one or more computing devices, identifying one or more objects that are each represented by an object vector corresponding to one of the distance values stored in the warp queues; and
by one or more computing devices, providing for presentation to the user one or more search results corresponding to one or more of the identified objects.

2. The method of claim 1, wherein each of one or more of the warp queues is stored as a lane-stride register array.

3. The method of claim 1, wherein each of one or more of the thread queues is stored in register memory of a graphics processing unit.

4. The method of claim 1, wherein each of one or more of the warp queues is stored in shared memory of a graphics processing unit.

5. The method of claim 1, wherein each of one or more of the warp queues is stored in register memory of a graphics processing unit.

6. The method of claim 1, wherein accessing the query vector representing the search query entered by the user comprises determining the query vector based on the search query.

7. The method of claim 1, wherein each object vector is a quantized vector.

8. The method of claim 1, wherein the each warp queue is a wavefront queue.

9. The method of claim 1, wherein each thread queue is operated on by a single thread of execution of a processor of the computing device.

10. The method of claim 1, wherein:
each object of the plurality of objects corresponds to at least one node in a graph of a social-networking system;
the graph comprises a plurality of nodes and edges connecting the nodes; and
the identified objects correspond to nodes in the graph that are responsive to the search query entered by the user.

11. The method of claim 10, wherein at least one of the plurality of object vectors represents at least one edge connecting the node corresponding to the object vector to another node in the graph.

12. The method of claim 11, wherein the at least one edge represents one or more of:
a friendship;
a family relationship;
a business or employment relationship;
a fan relationship;
a follower relationship;
a visitor relationship; or
a subscriber relationship.

13. The method of claim 1, wherein:
each initially-stored thread-queue distance value is a maximum sentinel distance value;
and each initially-stored warp-queue distance value is a maximum sentinel distance value.

14. One or more computer-readable non-transitory storage media embodying software that is operable when executed to:
access a query vector representing a search query entered by a user;
access a plurality of object vectors that each represent one of a plurality of objects;
determine a plurality of input distance values that each correspond to a distance between the query vector and one of the object vectors;
access a plurality of thread queues that initially store thread-queue distance values;
access a plurality of warp queues in a block, wherein:
the warp queues initially store warp-queue distance values; and
the block further comprises shared memory for the warp queues;
for each of the input distance values:
select one of the warp queues;
select one of the thread queues corresponding to the selected one of the warp queues;

when the input distance value is less than a greatest one of the distance values stored in the selected one of the thread queues, insert the input distance value into the selected one of the thread queues and eject the greatest one of the distance values stored in the selected one of the thread queues; and when a greatest one of the distance values stored in any of the thread queues is less than a greatest one of the distance values stored in the selected one of the warp queues, merge, within the shared memory in the block, the selected one of the thread queues with the selected one of the warp queues using an odd-size merging network in parallel with one or more other thread queues corresponding to the selected one of the warp queues;

identify one or more objects that are each represented by an object vector corresponding to one of the distance values stored in the warp queues; and provide for presentation to the user one or more search results corresponding to one or more of the identified objects.

15. The media of claim 14, wherein each of one or more of the warp queues is stored as a lane-stride register array.

16. The media of claim 14, wherein each of one or more of the thread queues is stored in register memory of a graphics processing unit.

17. The media of claim 14, wherein each of one or more of the warp queues is stored in shared memory of a graphics processing unit.

18. The media of claim 14, wherein each of one or more of the warp queues is stored in register memory of a graphics processing unit.

19. The media of claim 14, wherein accessing the query vector representing the search query entered by the user comprises determining the query vector based on the search query.

20. The media of claim 14, wherein each object vector is a quantized vector.

21. The media of claim 14, wherein each warp queue is a wavefront queue.

22. The media of claim 14, wherein each thread queue is operated on by a single thread of execution of a processor of the computing device.

23. The media of claim 14, wherein:
each initially-stored thread-queue distance value is a maximum sentinel distance value; and
each initially-stored warp-queue distance value is a maximum sentinel distance value.

24. A system comprising:
one or more processors at a first client computing device; and
a memory at the first client computing device coupled to the processors and comprising instructions operable when executed by the processors to cause the processors to:
access a query vector representing a search query entered by a user;
access a plurality of object vectors that each represent one of a plurality of objects;
determine a plurality of input distance values that each correspond to a distance between the query vector and one of the object vectors;
access a plurality of thread queues that initially store thread-queue distance values;
access a plurality of warp queues in a block, wherein:
the warp queues initially store warp-queue distance values; and
the block further comprises shared memory for the warp queues;
for each of the input distance values:
select one of the warp queues;
select one of the thread queues corresponding to the selected one of the warp queues;
when the input distance value is less than a greatest one of the distance values stored in the selected one of the thread queues, insert the input distance value into the selected one of the thread queues and eject the greatest one of the distance values stored in the selected one of the thread queues; and
when a greatest one of the distance values stored in any of the thread queues is less than a greatest one of the distance values stored in the selected one of the warp queues, merge, within the shared memory in the block, the selected one of the thread queues with the selected one of the warp queues using an odd-size merging network in parallel with one or more other thread queues corresponding to the selected one of the warp queues;
identify one or more objects that are each represented by an object vector corresponding to one of the distance values stored in the warp queues; and
provide for presentation to the user one or more search results corresponding to one or more of the identified objects.

25. The system of claim 24, wherein each of one or more of the warp queues is stored as a lane-stride register array.

26. The system of claim 24, wherein:
each initially-stored thread-queue distance value is a maximum sentinel distance value; and
each initially-stored warp-queue distance value is a maximum sentinel distance value.

* * * * *